(12) United States Patent
Guo et al.

(10) Patent No.: US 10,993,259 B2
(45) Date of Patent: Apr. 27, 2021

(54) RESOURCE INDICATION PROCESSING METHOD, PROCESSING APPARATUS, ACCESS POINT, AND STATION

(71) Applicant: Huawei Technologies Co., Ltd., Shenzhen (CN)

(72) Inventors: Yuchen Guo, Shenzhen (CN); Meilu Lin, Shenzhen (CN); Jian Yu, Shenzhen (CN); Xun Yang, Shenzhen (CN); Le Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 16/124,971

(22) Filed: Sep. 7, 2018

(65) Prior Publication Data

US 2019/0082461 A1  Mar. 14, 2019

Related U.S. Application Data

(63) Continuation of application No. PCT/CN2016/076000, filed on Mar. 9, 2016.

(51) Int. Cl.
| | |
|---|---|
| *H04W 74/08* | (2009.01) |
| *H04W 80/02* | (2009.01) |
| *H04W 84/12* | (2009.01) |
| *H04L 5/00* | (2006.01) |
| *H04W 74/02* | (2009.01) |
| *H04L 1/16* | (2006.01) |
| *H04W 74/00* | (2009.01) |

(52) U.S. Cl.
CPC .......... *H04W 74/02* (2013.01); *H04L 1/1614* (2013.01); *H04L 5/0041* (2013.01); *H04L 5/0082* (2013.01); *H04L 5/0094* (2013.01); *H04L 5/0007* (2013.01); *H04W 74/006* (2013.01); *H04W 80/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0210243 A1 | 8/2010 | Vujcic | |
| 2012/0314619 A1 | 12/2012 | Wiberg et al. | |
| 2015/0023236 A1 | 1/2015 | Choi et al. | |
| 2015/0071211 A1 | 3/2015 | Seok et al. | |
| 2016/0119881 A1* | 4/2016 | Merlin | H04L 27/2601 370/328 |
| 2017/0181187 A1* | 6/2017 | Asterjadhi | H04W 74/006 |
| 2017/0303295 A1 | 10/2017 | Wu et al. | |
| 2018/0242355 A1* | 8/2018 | Lou | H04W 72/121 |

FOREIGN PATENT DOCUMENTS

| | | |
|---|---|---|
| CN | 101193421 A | 6/2008 |
| CN | 102595635 A | 7/2012 |
| CN | 102763481 A | 10/2012 |
| CN | 103298135 A | 9/2013 |
| CN | 104272847 A | 1/2015 |
| WO | 2014070071 A1 | 5/2014 |

* cited by examiner

*Primary Examiner* — Scott M Sciacca
(74) *Attorney, Agent, or Firm* — Leydig, Voit & Mayer, Ltd.

(57) ABSTRACT

A resource indication processing method is disclosed, and is applied to a wireless local area network that uses an OFDMA technology. The method includes: sending or receiving a trigger frame, where the trigger frame includes information (I1) used to indicate whether the trigger frame allows random access transmission.

10 Claims, 20 Drawing Sheets

RESOURCE INDICATION PROCESSING METHOD, PROCESSING APPARATUS, ACCESS POINT, AND STATION

CROSS-REFERENCE TO RELATED APPLICATIONS

This application is a continuation of International Application No. PCT/CN2016/076000, filed on Mar. 9, 2016, the disclosure of which is hereby incorporated by reference in its entirety.

TECHNICAL FIELD

Embodiments of the present invention relate to wireless communications technologies, and more specifically, to an information transmission method, an access point, and a station.

BACKGROUND

With development of the mobile Internet and popularity of intelligent terminals, data traffic increases rapidly. A wireless local area network (WLAN) becomes one of mainstream mobile broadband access technologies due to advantages of a high rate and low costs.

To significantly increase a service transmission rate of a WLAN system, in a next-generation Institute of Electrical and Electronics Engineers (IEEE) 802.11ax standard, an orthogonal frequency division multiple access (OFDMA) technology is further used based on an existing orthogonal frequency division multiplexing (OFDM) technology. In the OFDMA technology, radio channel communication resources are divided into a plurality of orthogonal communication resource blocks (RB). The RBs may share time, but are orthogonal in frequency domain.

The OFDMA technology allows a plurality of nodes to simultaneously send and receive data. When an access point needs to transmit data to a station, resources are allocated based on an RB or an RB group. Different channel resources are allocated to different STAs at a same moment, so that a plurality of STAs efficiently access channels, thereby increasing channel utilization. The OFDMA-based WLAN system needs to efficiently indicate a communication resource to a STA.

SUMMARY

Embodiments of the present invention provide an information transmission method and a corresponding processing apparatus, such as an access point and a station, to efficiently indicate a communication resource to the station.

According to an aspect, a resource indication sending method is provided, including:
generating, by an access point, a trigger frame, where the trigger frame includes information (I1) used to indicate whether the trigger frame allows random access transmission; and
sending, by the access point, the trigger frame.

According to another aspect, a resource indication receiving method is provided, including:
receiving, by a station, a trigger frame, where the trigger frame includes information (I1) used to indicate whether the trigger frame allows random access transmission; and
when the station needs to perform random access transmission, performing, by the station, random access transmission by using a random access resource indicated by the trigger frame.

According to another aspect, a resource indication sending method is provided, including:
generating, by an access point, a trigger frame, where the trigger frame includes information (I3) used to indicate a quantity of sub-channels used for random access, or information (I4) used to indicate a total quantity of resource units RUs used for random access; and
sending, by the access point, the trigger frame.

According to another aspect, a resource indication receiving method is provided, including:
receiving, by a station, a trigger frame, where the trigger frame includes information (I3) used to indicate a quantity of sub-channels used for random access, or information (I4) used to indicate a total quantity of resource units RUs used for random access; and
when the station needs to perform random access transmission, performing, by the station, random access transmission by using a random access resource indicated by the trigger frame.

According to another aspect, a resource indication sending method is provided, including:
generating, by an access point, a trigger frame, where the trigger frame includes a sub-channel allocation field used to indicate a plurality of sub-channels obtained by dividing whole bandwidth, and information (I6) used to indicate a sub-channel that is used for random access in the sub-channels obtained through division based on the sub-channel allocation field; and
sending, by the access point, the trigger frame.

According to another aspect, a resource indication receiving method is provided, including:
receiving, by a station, a trigger frame, where the trigger frame includes a sub-channel allocation field used to indicate a plurality of sub-channels obtained by dividing whole bandwidth; and
information (I6) used to indicate a sub-channel that is used for random access in the sub-channels obtained through division based on the sub-channel allocation field; and
when the station needs to perform random access transmission, performing, by the station, random access transmission by using a random access resource indicated by the trigger frame.

According to another aspect, a resource indication sending method is provided, including:
generating, by an access point, a trigger frame, where the trigger frame includes a sub-channel allocation field used to indicate a plurality of sub-channels obtained by dividing whole bandwidth, and a user information part used to indicate configuration information of each of some sub-channels indicated by the sub-channel allocation field, and remaining sub-channels, whose configuration information is not indicated in the user information part, in the plurality of sub-channels indicated by the sub-channel allocation field are used for random access; and sending, by the access point, the trigger frame.

According to another aspect, a resource indication receiving method is provided, including:
receiving, by a station, a trigger frame, where the trigger frame includes a sub-channel allocation field used to indicate a plurality of sub-channels obtained by dividing whole bandwidth, and a user information part used to indicate configuration information of each of some sub-channels indicated by the sub-channel allocation field, and remaining sub-channels, whose configuration information is not indicated in the user information part, in the plurality of sub-channels indicated by the sub-channel allocation field are used for random access; and when the station needs to perform random access transmission, performing, by the station, random access transmission by using a random access resource indicated by the trigger frame.

According to another aspect, a resource indication sending method is provided, including:

generating, by an access point, a trigger frame, where the trigger frame includes a sub-channel allocation field used to indicate a plurality of sub-channels obtained by dividing whole bandwidth and a user information part, where the user information part is used to indicate that each sub-channel obtained through division based on the sub-channel allocation field is used for scheduled transmission or is used for random access transmission, and includes configuration information used for scheduled transmission, or the number of RUs occupied by each random access channel when the channel is used for random access transmission; and sending, by the access point, the trigger frame.

According to another aspect, a resource indication receiving method is provided, including:

receiving, by a station, a trigger frame, where the trigger frame includes a sub-channel allocation field used to indicate a plurality of sub-channels obtained by dividing whole bandwidth and a user information part, where the user information part is used to indicate that each sub-channel obtained through division based on the sub-channel allocation field is used for scheduled transmission or is used for random access transmission, and includes configuration information used for scheduled transmission, or the number of RUs occupied by each random access channel when the channel is used for random access transmission; and when the station needs to perform random access transmission, performing, by the station, random access transmission by using a random access resource indicated by the trigger frame.

Correspondingly, an implementation of the present invention further provides a corresponding apparatus that may perform the foregoing method, such as a chip, an access point, or a station.

In the foregoing implementations, a communication resource that may be used for random access may be efficiently indicated to the station, to facilitate use of the station. Some communication resources may be saved in some implementations.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

An access point (AP) may also be referred to as a wireless access point, a bridge, a hot spot, or the like, and may access a server or a communications network.

A station (STA) may also be referred to as a user, and may be a wireless sensor, a wireless communications terminal, or a mobile terminal, such as a mobile phone (or referred to as a "cellular" phone) supporting a Wi-Fi communication function or a computer having a wireless communication function. For example, the station may be a portable, pocket-sized, handheld, computer built-in, wearable, or in-vehicle wireless communications apparatus that supports a Wi-Fi communication function and exchanges communication data such as voice and data with a radio access network.

Figure 1A:
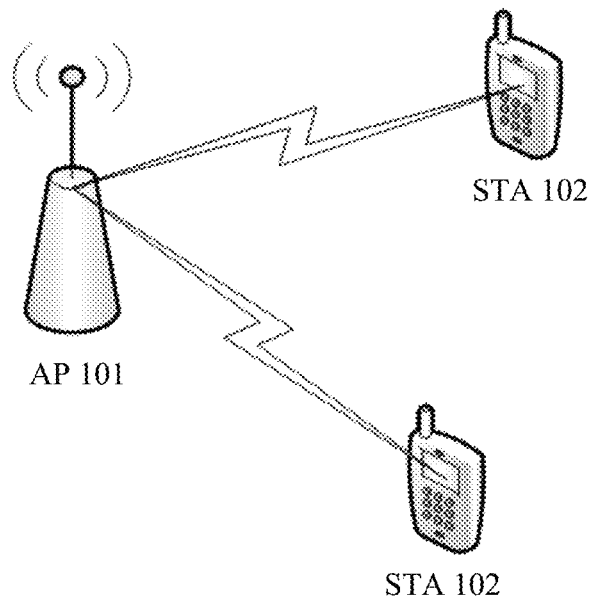
FIG. 1a is a schematic diagram of a system architecture applicable to an embodiment of the present invention.

FIG. 1a is a simple schematic diagram of a WLAN system applied to an implementation of the present invention. The system in FIG. 1a includes one or more access points APs 101 and one or more stations STAs 102. Wireless communication is performed between the access point 101 and the station 102 by using an OFDMA technology. A trigger frame sent by the access point 101 includes indication information for a communication resource of the station 102 or a station group.

Figure 1B:
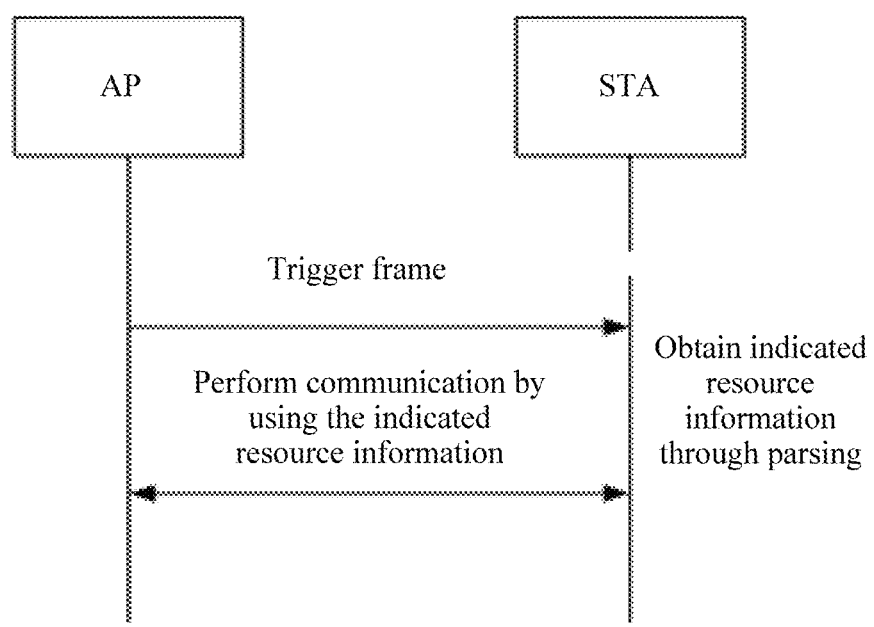
FIG. 1b is an applicable schematic flowchart according to an embodiment of the present invention.

Specifically, referring to FIG. 1b, an implementation of the present invention provides a resource indication method applied to a wireless local area network that uses an OFDMA technology. An access point AP constructs (or generates) and sends a trigger frame. The trigger frame includes information used to indicate a random access resource. For a specific structure of the trigger frame, refer to subsequent implementations.

As mentioned above, OFDMA transmission is multiuser transmission. The trigger frame sent by the AP usually includes sub-channel allocation information and a user information part. In this implementation provided in the present invention, the sub-channel allocation information is used to divide a whole channel into sub-channels. The user information part is used to allocate a specific sub-channel to a specific user (for scheduled transmission), or allocate a specific sub-channel to perform random access transmission (in other words, any user can perform transmission on the sub-channel).

Structure of a Trigger Frame

The trigger frame mentioned in each implementation of this specification may be a physical layer trigger frame, or may be a MAC layer trigger frame. The trigger frame is used to trigger OFDMA transmission.

Figure 2:
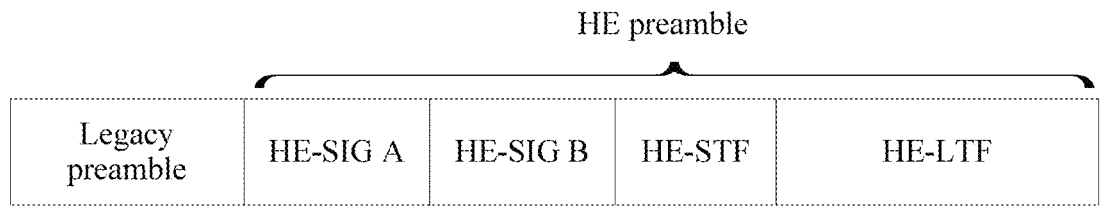
FIG. 2 is a schematic diagram of a physical layer trigger frame according to an embodiment of the present invention.

For example, the physical layer trigger frame is an NDP frame, has only a physical layer preamble, and does not have an MPDU (MAC protocol data unit) part. As shown in FIG. 2, the physical layer trigger frame includes two parts: a legacy preamble and an HE preamble, and the high efficiency preamble further includes four parts: HE-SIG A, HE-SIG B, an HE-STF, and an HE-LTF. Trigger signaling of the trigger frame is located in the HE-SIG B of the HE preamble of the physical layer preamble.

Figure 3:
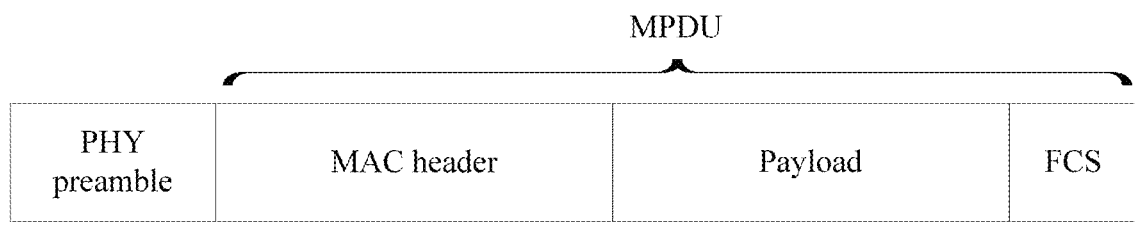
FIG. 3 is a schematic diagram of a MAC layer trigger frame according to an embodiment of the present invention.

The MAC layer trigger frame includes a physical layer preamble and an MPDU. The MPDU further includes two parts: a MAC header and a payload. As shown in FIG. 3, trigger signaling of the trigger frame is located in the payload of the MPDU.

Figure 4:
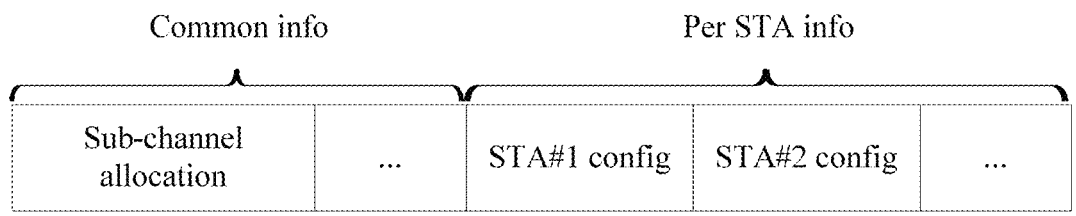
FIG. 4 is a schematic structural diagram of a trigger frame according to an embodiment of the present invention.
Figure 5:
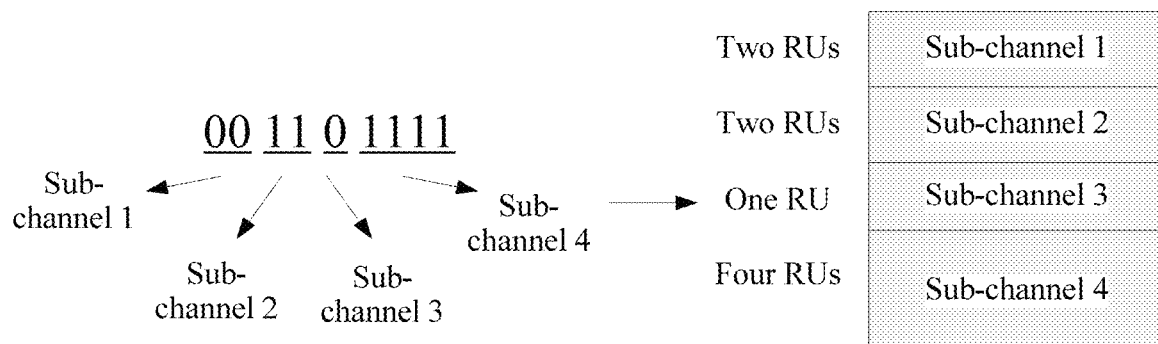
FIG. 5 is a schematic diagram of sub-channel allocation information according to an embodiment of the present invention.

As shown in FIG. 4, the trigger signaling of the physical layer trigger frame or the MAC layer trigger frame includes a common information part and a user information part located after the common information part. The common information part includes common information for all users, such as sub-channel allocation information or a transmission parameter, for example, bandwidth. As shown in FIG. 5, the sub-channel allocation information is mainly used to indicate several sub-channels obtained by dividing whole bandwidth. The user information part is for configuration information of each sub-channel. Each sub-channel corresponds to one segment of user information, and the user information is used to indicate that a sub-channel obtained through division based on a sub-channel allocation field is used to transmit information about a specific station or a specific station group and indicate a corresponding transmission parameter. In an example in FIG. 5, if the whole bandwidth is divided into four sub-channels by using the sub-channel allocation information, the user information part includes four segments of user information that respectively correspond to the four sub-channels. The user information part includes information, such as an identifier of a user and a transmission parameter, such as an MCS or a spatial flow. After receiving the trigger frame, a station usually first reads the common information part, and then reads the user information part when necessary.

Although the sub-channel allocation information is not necessary content in each implementation, for clearer description, the sub-channel allocation information is described below in detail. Sub-channel allocation is usually performed based on a minimum communication resource unit—a resource unit (RU) used for transmission. In other words, one or more contiguous resource units RUs constitute a sub-channel. During actual transmission, a station or a station group performing transmission on each sub-channel is allocated for the sub-channel. Alternatively, a frequency band on which one or more RUs allocated for a station or a station group are located is referred to as a sub-channel. It should be noted that the RU mentioned in the patent of the present invention is a subcarrier group including several subcarriers. For example, in a next-generation Wi-Fi standard, the RU is a subcarrier group including 26 subcarriers.

For example, a 20 MHz-bandwidth channel includes nine RUs. Sub-channel allocation information of the channel includes nine bits, each bit is used to indicate grouping information for the nine RUs, the 20 MHz-bandwidth channel is divided into several sub-channels, and each sub-channel occupies one or more RUs. For example, referring to FIG. 5, FIG. 5 shows an example "001101111" of one piece of sub-channel allocation information. On the left side of FIG. 5, each bit of the sub-channel allocation information has the following meaning: The first two 0 indicate that the first two RUs constitute one sub-channel, the next two 1 indicate that a third RU and a fourth RU constitute one sub-channel, the next 0 indicates that a fifth RU constitutes one sub-channel, and the last four 1 indicate that the last four RUs constitute one sub-channel, as shown on the right side of FIG. 2.

Each sub-channel needs to correspond to a user information part, and the user information part is used to indicate user parameter information. The user parameter information includes transmission parameters, for example, an ID of a user (an ID of a station or an ID of a station group) and an MCS or a quantity of flows. A specific parameter is not limited in each implementation.

Figure 6:
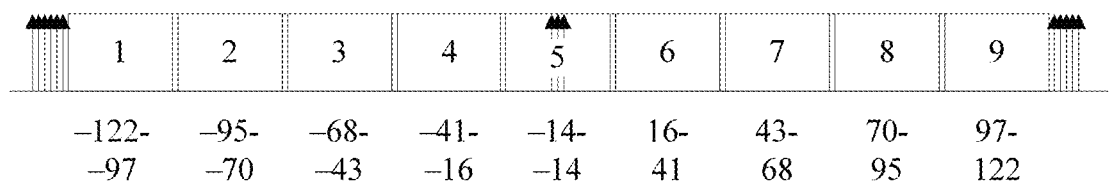
FIG. 6 is a schematic diagram of resource block allocation according to an embodiment of the present invention.

More specifically, 26 subcarriers are currently used as one resource block in the 802.11ax. As shown in FIG. 6, a bandwidth of 20 M is used as an example, and a quantity of DFT/IDFT points in a data symbol part in the 802.11ax is 256. In other words, 256 subcarriers exist. Subcarriers—1, 0, and 1 are direct current (DC) components, a subcarrier—122 to a subcarrier—2 on a left sideband and a subcarrier 2 to a subcarrier 122 on a right sideband are used to carry data information. In other words, 242 subcarriers are used to carry data information. A subcarrier—128 to a subcarrier—123 and a subcarrier 123 to a subcarrier 128 are guard bands. The 242 subcarriers are grouped into nine resource blocks, each resource block includes 26 subcarriers, and there are eight remaining unused subcarriers. It can be learned from FIG. 6 that the nine resource blocks respectively occupy the subcarrier—122 to the subcarrier—97 (a resource block 1), the subcarrier—95 to the subcarrier—70 (a resource block 2), the subcarrier—68 to the subcarrier—43 (a resource block 3), the subcarrier—41 to the subcarrier—16 (a resource block 4), the subcarrier—14 to the subcarrier 14 (a resource block 5), the subcarrier 16 to the subcarrier 41 (a resource block (a resource block 6), the subcarrier 43 to the subcarrier 68 (a resource block 7), the subcarrier 70 to the subcarrier 95 (a resource block 8), and the subcarrier 97 to the subcarrier 122 (a resource block 9). Remaining eight unused subcarriers are respectively the subcarrier—96, the subcarrier—69, the subcarrier—42, the subcarrier—15, the subcarrier 15, the subcarrier 42, the subcarrier 69, and the subcarrier 96, and are referred to as a set of unoccupied subcarriers herein.

Figure 7:
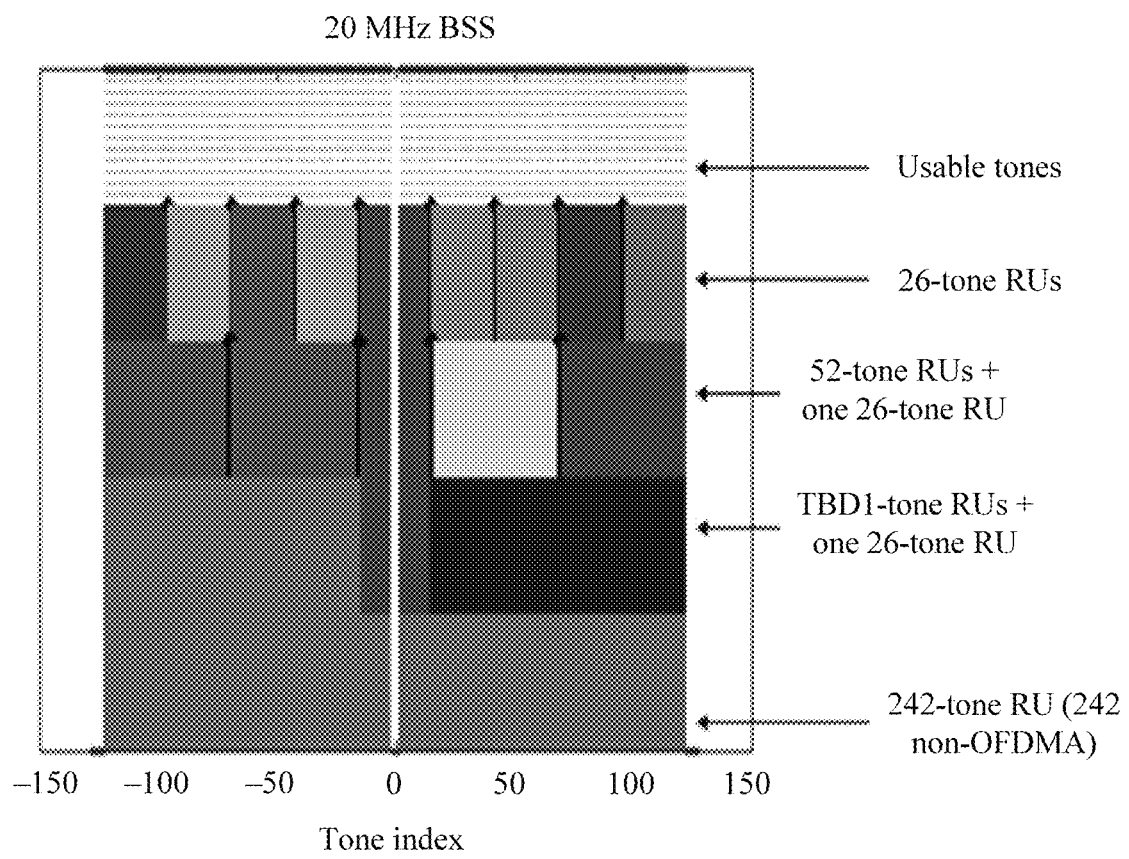
FIG. 7 is a schematic diagram of sub-channel allocation according to an embodiment of the present invention.

More specifically, division of resource blocks (allocation of a sub-channel) is limited in the 802.11ax as follows. For example, in a 20 M-bandwidth communication channel, resource blocks having only four sizes of 1×26, 2×26, 4×26, and 242 exist. Referring to FIG. 7, a block diagram of a bandwidth of 20 MHz (in other words, a sub-channel allocation diagram) includes four layers, a middle 1×26 resource block crosses a DC component, and a DC subcarrier is a middle gap in the figure. A first layer is a 1×26 distribution diagram, a second layer is a distribution diagram of 2×26 and 1×26, a third layer is a distribution diagram of 4×26 and 1×26, and a fourth layer is a 242 distribution diagram. The 20 MHz-sub-channel allocation diagram may show a frequency spectrum or a channel having a size of 242 subcarriers including any sub-channel at the three layers, and only one sub-channel at the layers can be allocated to each user.

Possible Trigger Frame

In this implementation, special attention needs to be paid to how a trigger frame indicates a sub-channel resource used for uplink OFDMA random access.

In a relatively poor implementation, a common information part of the trigger frame includes an indication information bit used to indicate that all sub-channels obtained through division based on a sub-channel allocation field are used for random access. For example, referring to FIG. 8, if a whole OFDMA transmission bandwidth is 20 MHz, nine RUs are included in total. If the nine RUs on the bandwidth of 20 MHz are grouped into four sub-channels based on the sub-channel allocation field, the four sub-channels respectively occupy two RUs, two RUs, one RU, and four RUs. When the indication information bit included in the trigger frame is 1, it indicates that the four sub-channels are all used for random access. To be specific, the four random access sub-channels respectively occupy two RUs, two RUs, one RU, and four RUs. When the indication information bit is 0, it indicates that the four sub-channels are not all used for random access. In other words, some are used for random access or none can be used for random access.

Figure 9:
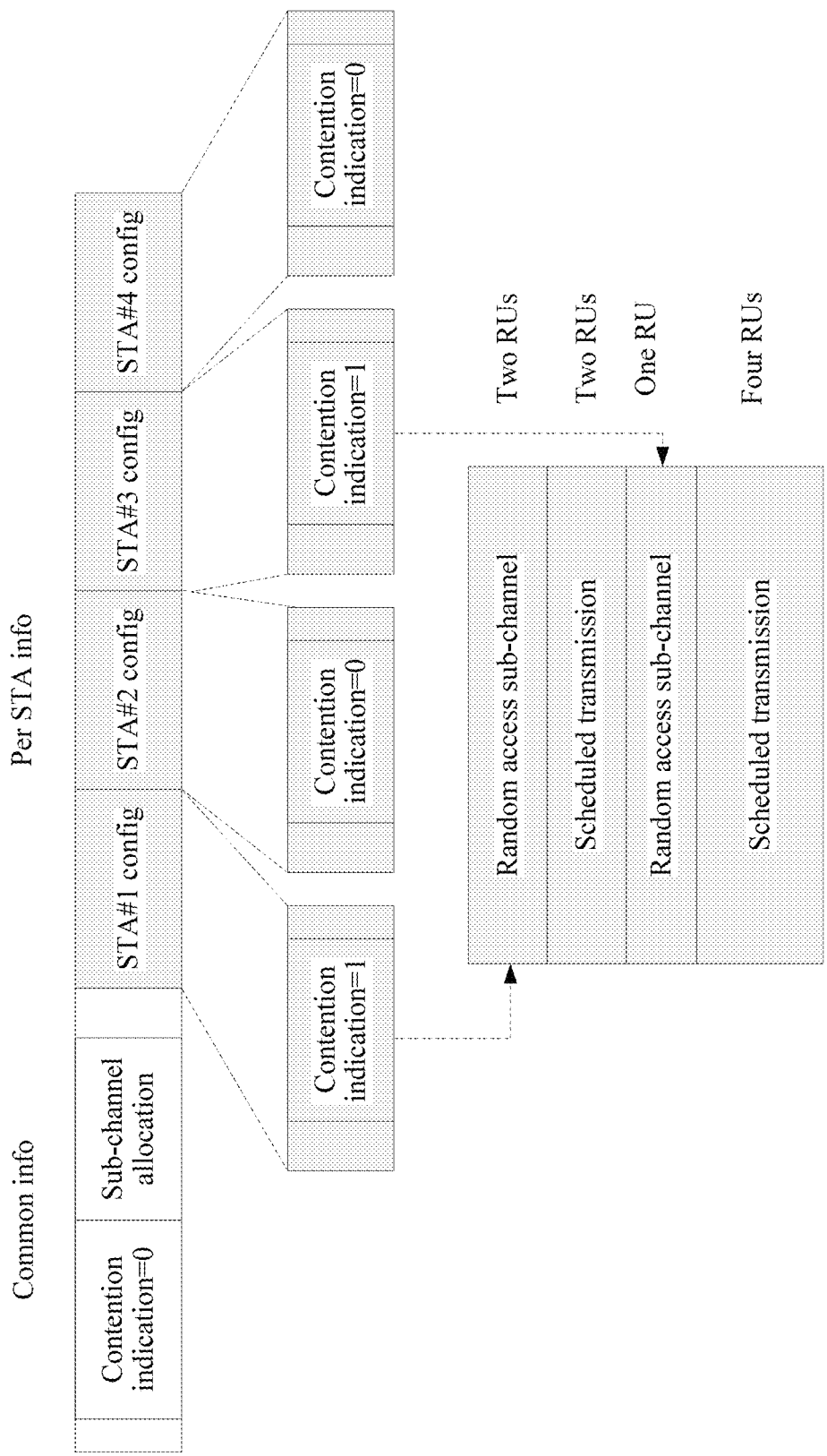

In addition, in the relatively poor implementation, a user information part of the trigger frame respectively includes one indication information bit for each user (a station or a station group), and the indication information bit is used to indicate that a sub-channel corresponding to the user information part can be used for random access. As shown in FIG. 9, if a whole OFDMA transmission bandwidth is 20 MHz, nine RUs are included in total. If the nine RUs on the bandwidth of 20 MHz are grouped into four sub-channels based on the sub-channel allocation field, the four sub-channels respectively occupy two RUs, two RUs, one RU, and four RUs. Therefore, the user information part of the trigger frame includes four pieces of user information. For each piece of user information, an indication information bit being 1 indicates that the sub-channel is used for random access, and an indication information bit being 0 indicates that the sub-channel is not used for random access (in other words, the sub-channel is used for scheduled transmission). As shown in FIG. 9, a first sub-channel (occupying two RUs) and a third sub-channel (occupying one RU) are used for random access, and remaining sub-channels are used for scheduled transmission.

However, in the foregoing implementation, the sub-channel allocation field needs to occupy relatively high signaling overheads, and needs to indicate whether each sub-channel is used for random access. Therefore, efficiency is relatively low.

Figure 10A:
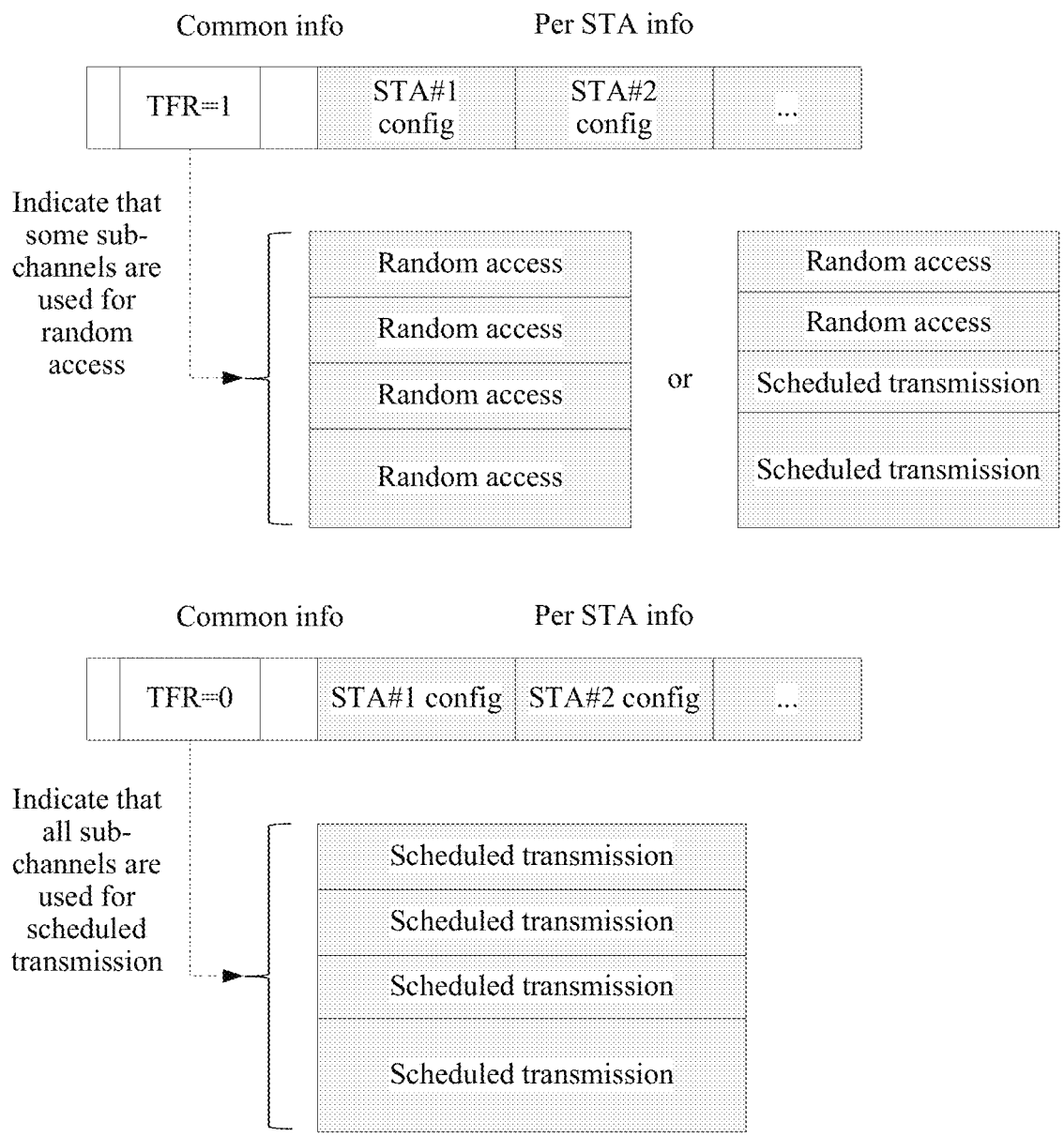

Structure 1 of a Trigger Frame:

Referring to the preferable structure of the trigger frame shown in FIG. 10a, the trigger frame includes first indication information I1 used to indicate whether the trigger frame allows random access transmission. For example, a name of the first indication information I1 is a random access transmission trigger indication bit, and is a TFR indication bit for short. If the first indication information I1 is 1, a resource of the trigger frame is allocated for random access. If the first indication information I1 is 0, no resource of the trigger frame is allocated for random access (in other words, whole transmission bandwidth is used for scheduled transmission).

After a station receives the trigger frame, when the station needs to perform random access but the TFR indication bit is 0, the station may stop reading subsequent information of the trigger frame, thereby reducing waste of processing resources of the station.

In addition to the first indication information I1, the trigger frame further includes second indication information I2 used to indicate whether the whole transmission bandwidth is used for random access. For example, the second indication information I2 is referred to as a "contention indication" indication bit. The indication bit being 1 indicates that the whole transmission bandwidth is used for random access, and the indication bit being 0 indicates that some transmission channels are used for random access. In this way, two trigger frames allowing random access may be further distinguished, in other words, two subtypes indicating that the whole transmission bandwidth is used for random access and a part of the transmission bandwidth is used for random access.

Figure 10B:
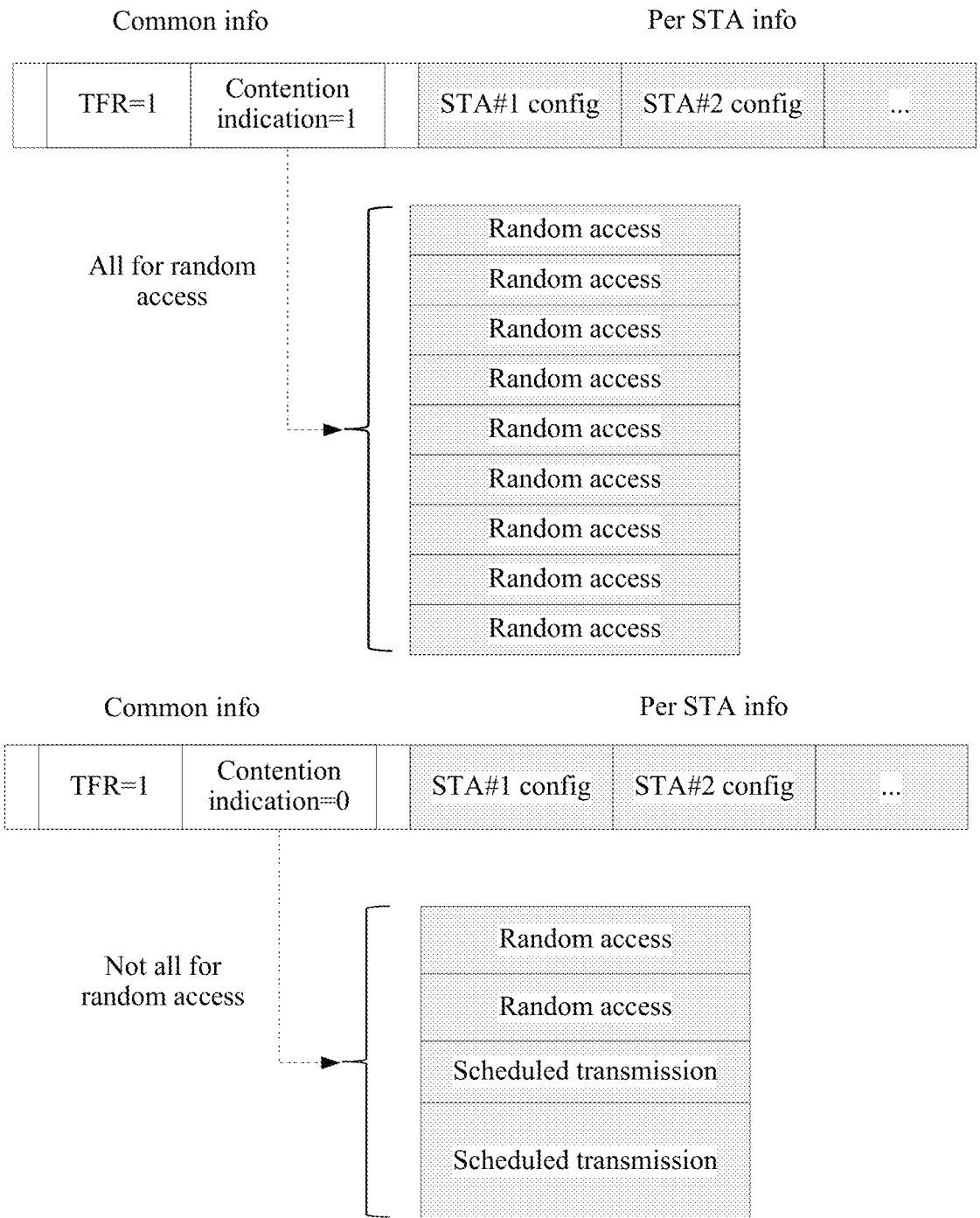

In this implementation, referring to FIG. 10b, if the first indication information I1 is 1 and the second indication information I2 is also 1, the whole transmission bandwidth is used for random access. The trigger frame does not include sub-channel allocation information (located in a common information part) or a user information part. In this way, communication resources can be further saved.

In addition, it should be noted that only the first indication information I1 (the TFR indication bit) may be included and the second indication information I2 (the contention indication bit) may not be included in this embodiment. Alternatively, the TFR indication bit and the contention indication indication bit do not appear in a tight coupling manner. In this case, TFR=1 indicates that a resource of the trigger frame is allocated for random access, and TFR=0 indicates that no resource of the trigger frame is allocated for random access, in other words, the whole transmission bandwidth is used for scheduled transmission. A function of the first indication information I1 herein is different from that of the indication information bit in the implementation shown in FIG. 9.

Figure 11A:
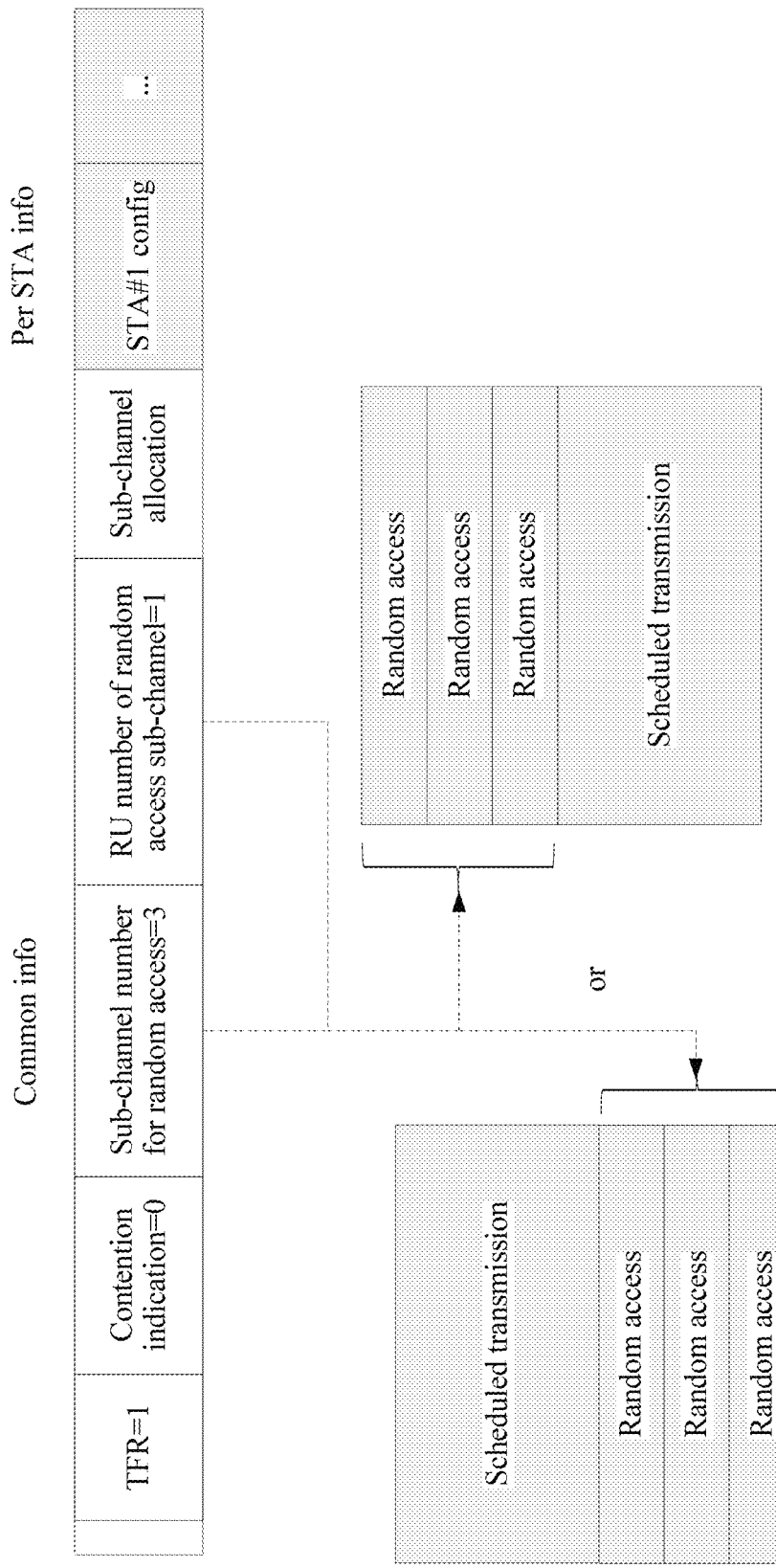

Structure 2 of a trigger frame:

Referring to FIG. 11a, FIG. 11a shows a trigger frame used when first indication information I1 (a TFR indication bit) is 1 and second indication information I2 (a contention indication bit) is 0, in other words, a trigger frame used when some transmission channels are used for random access. Certainly, a specific trigger frame may alternatively not include the first indication information I1 (the TFR indication bit), or may not include the second indication information I2 (the contention indication bit), or may not include the first indication information I1 (the TFR indication bit) and the second indication information I2 (the contention indication bit).

Specifically, a trigger frame sent by an AP includes a sub-channel allocation field, and the sub-channel allocation field is usually used to indicate several sub-channels obtained by dividing whole bandwidth. Different from another implementation, the trigger frame includes third indication information I3 used to indicate a quantity of sub-channels that are used for random access. The quantity of sub-channels used for random access may be referred to as a random access sub-channel information field "sub-channel number for random access".

In addition, the trigger frame may further include fifth indication information I5 used to indicate a quantity N of RUs occupied by each random access sub-channel. The quantity N of RUs occupied by each random access sub-channel may be referred to as a random access RU information field "RU number of random access sub-channel". Preferably, a value of N is 1, 2, 4, or 9.

In this embodiment of the present invention, a location of a sub-channel used for random access is relatively fixed. To be specific, the sub-channel occupies a segment of contiguous RUs at the beginning or at the end of a whole frequency band. If a value of the random access sub-channel information field "sub-channel number for random access" is M, and a value of the random access RU information field "RU number of random access sub-channel" is N, RUs used for random access are M×N RUs at the beginning or at the end of the whole frequency band or a whole channel. For example, in an example in FIG. 11a, three sub-channels used for random access are allocated in the trigger frame, and each random access sub-channel occupies one RU. In this case, the RUs used for random access are three RUs at the beginning of the whole channel or three RUs at the end of the whole channel.

Figure 11B:
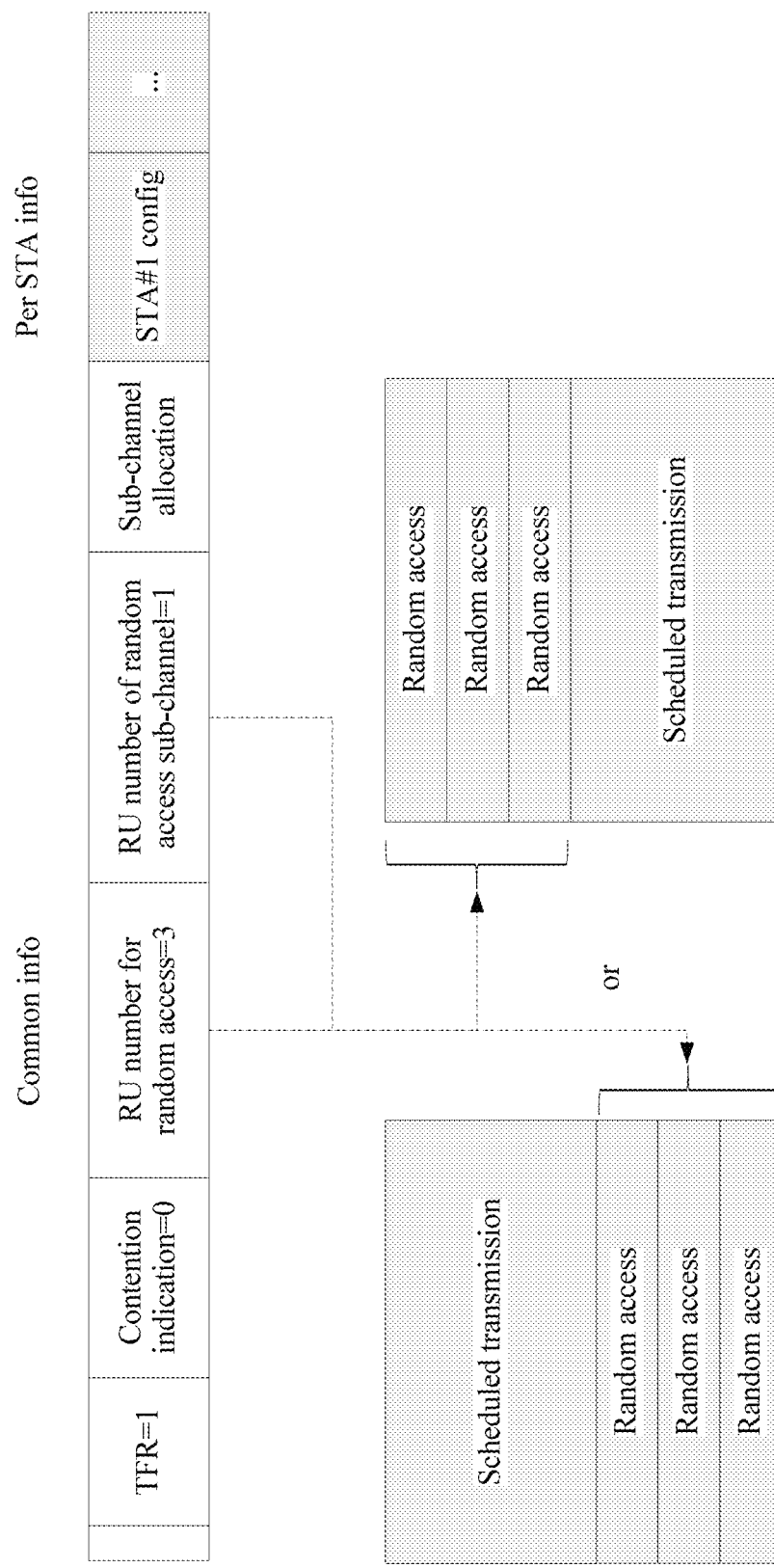

Alternatively, referring to FIG. 11b, in this embodiment, the trigger frame does not include the third indication information I3: the information field "sub-channel number for random access", but includes fourth indication information used to indicate a total quantity of RUs used for random access. The total quantity of RUs used for random access may be referred to as a total random access RU information field "RU number for random access". In other words, the trigger frame includes the fourth indication information and the fifth indication information I5.

A station receiving the trigger frame determines, based on the trigger frame, the location of the sub-channel used for random access, and performs random access and transmission on the related sub-channel. Specifically:

If a value of the "RU number for random access" is T and a value of the "RU number of random access sub-channel" is N, the sub-channel used for random access occupies T contiguous RUs at the beginning or at the end of the whole frequency band. If an RU used for random access includes an RU at a special location (for example, a middle RU on the bandwidth of 20 MHz shown in FIG. 3), the RU at the special location is used as an independent random access sub-channel. Other RUs are sequentially grouped, and each random access sub-channel occupies N contiguous RUs. If it is found that a remaining RU is not enough to constitute the N contiguous RUs during grouping, the remaining RU is used as an independent random access sub-channel.

Alternatively, the trigger frames in FIG. 11a and FIG. 11b may not include the fifth indication information I5 (the random access RU information field). In this case, the quantity of RUs occupied by each sub-channel used for random access is a default value, for example, one or two.

It should be noted that, preferably, after some RUs are grouped as a sub-channel for random access, a sub-channel allocation field in a common information part of the trigger frame may perform grouping indication only for other RUs. For example, the three RUs in FIG. 11a are already indicated as sub-channels for random access, and for a 20 MHz-channel occupying nine RUs, a sub-channel allocation field may occupy only six bits. In other words, six remaining RUs may be grouped. In this way, signaling overheads of the sub-channel allocation field can be reduced to some extent.

Figure 12A:
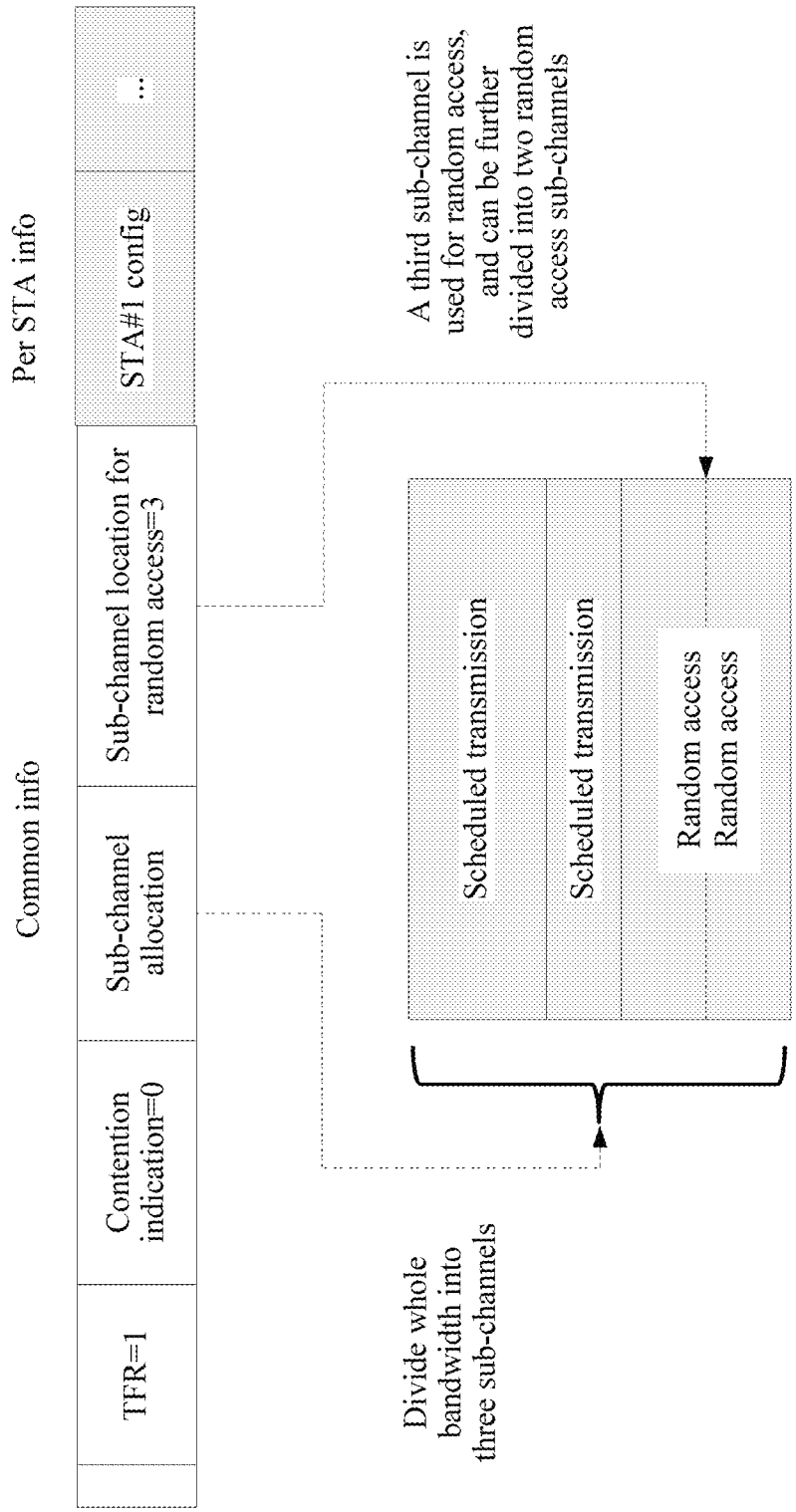
Figure 12B:
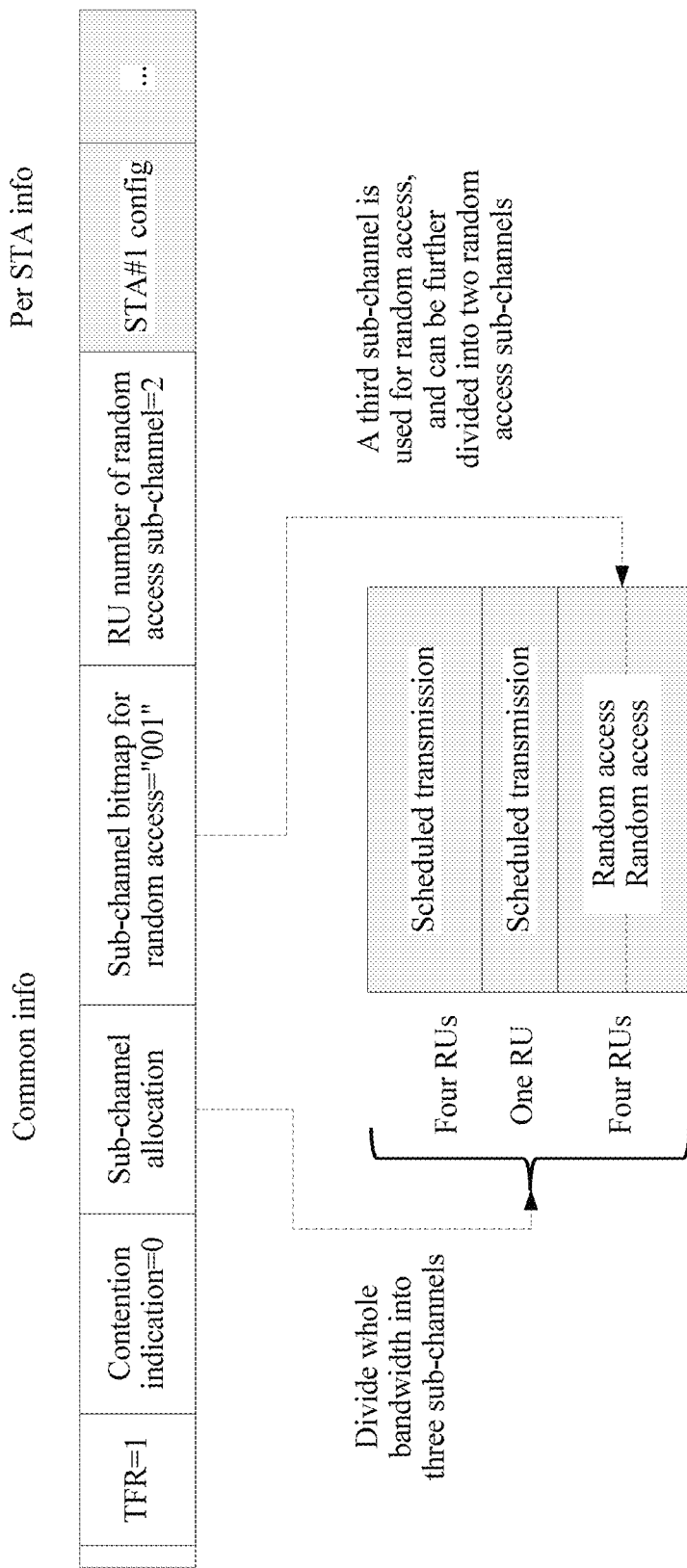

Structure 3 of a Trigger Frame:

Referring to FIG. 12a and FIG. 12b, FIG. 12a and FIG. 12b show a trigger frame used when first indication information I1 (a TFR indication bit) is 1 and second indication information I2 (a contention indication bit) is 0, in other words, another trigger frame used when some transmission channels are used for random access. Certainly, a specific trigger frame may alternatively not include the first indication information I1 (the TFR indication bit), or may not include the second indication information I2 (the contention indication bit), or may not include the first indication information I1 (the TFR indication bit) and the second indication information I2 (the contention indication bit).

Referring to FIG. 12a, a trigger frame sent by an AP includes a sub-channel allocation field, and the sub-channel allocation field is used to indicate several sub-channels obtained by dividing whole bandwidth. Different from another implementation, the trigger frame includes sixth indication information I6 used to indicate that a specific sub-channel (or specific sub-channels) of the sub-channels obtained through division based on the sub-channel allocation field is (or are) used for random access. Specifically, the sixth indication information I6 may be (I6-1) that is referred to as a random access sub-channel location information field "sub-channel location for random access" in FIG. 12a and that specifically indicates a location of a sub-channel used for random access. Alternatively, the sixth indication information I6 may be (I6-2) that is referred to as a random access sub-channel bitmap information field "sub-channel bitmap for random access" in FIG. 12b and that specifically indicates, in a bitmap manner, whether each sub-channel is used for random access.

FIG. 12a is used as an example, the AP divides the whole bandwidth (for example, of 20 MHz) into three sub-channels by using the sub-channel allocation field, and each sub-channel occupies four RUs, one RU, and four RUs. A value of the information field "sub-channel location for random access" is 3 (or is indicated as 011 in a binary manner), and indicates that a third sub-channel is used for random access. Alternatively, FIG. 12b is used as an example, the AP divides the whole bandwidth (for example, of 20 MHz) into three sub-channels by using the sub-channel allocation field, and each sub-channel occupies four RUs, one RU, and four RUs. In this case, a value of the information field "sub-channel bitmap for random access" is "001", and indicates that a third sub-channel is used for random access.

Figure 12C:
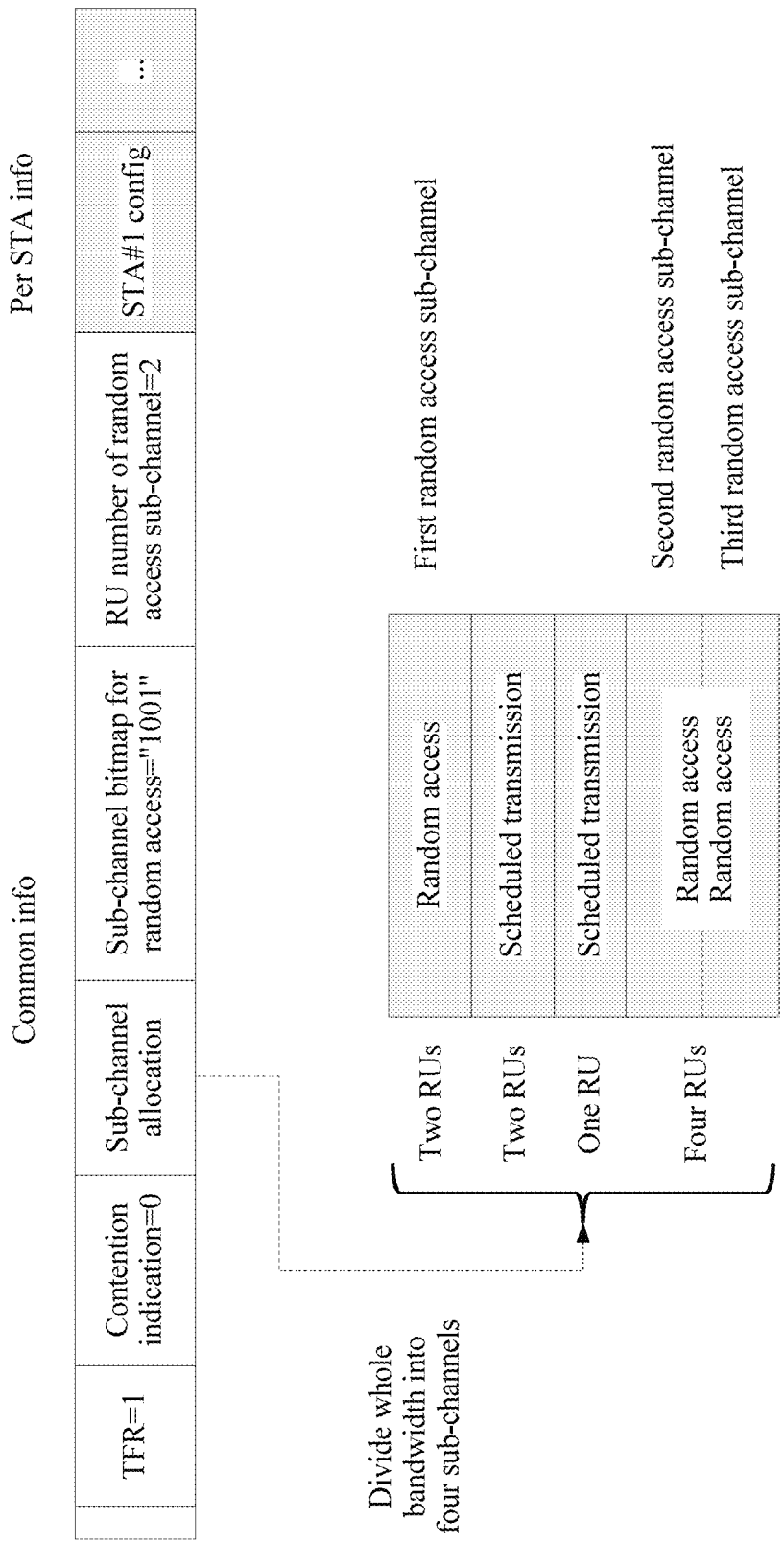

In addition, as shown in FIG. 12b and FIG. 12c, the trigger frame may alternatively include the fifth indication information I5 mentioned above, used to indicate the quantity of RUs occupied by each sub-channel used for random access. Fifth indication information I5 in FIG. 12b and FIG. 12c indicates that the number of RUs occupied by each sub-channel used for random access is two.

Certainly, the trigger frame may alternatively not include the fifth indication information I5 (the random access RU information field). In this case, the quantity of RUs occupied by each sub-channel used for random access is a default value, for example, one.

Preferable Structure 3a of a Trigger Frame:

In the another preferable structure of the trigger frame, a common part of the trigger frame does not include sub-channel allocation information, the sub-channel allocation information is located in a user information part, and one sub-channel is obtained through division for a corresponding user by using the sub-channel allocation information for transmission.

When the trigger frame is used to trigger uplink random access, a special AID (for example, AID=0) in the user information part of the trigger frame may be used to indicate that one or more sub-channels are allocated based on the user information part for random access, or an independent piece of indication information may be used to indicate that one or more sub-channels are allocated based on the user information part for random access. To flexibly indicate whether each minimum RU is used for random access, the user information part of the trigger frame may include a piece of bitmap (bitmap) information. The bitmap information may be seventh indication information I7. The bitmap information is used to indicate whether each minimum RU is used for random access, 1 may be used to indicate that the corresponding minimum RU is used for random access, and 0 may be used to indicate that the corresponding minimum RU is not used for random access. Alternatively, indication may be performed vice versa. This is not limited in this embodiment. In addition, the minimum RU is an RU including 26 subcarriers.

Figure 12D:
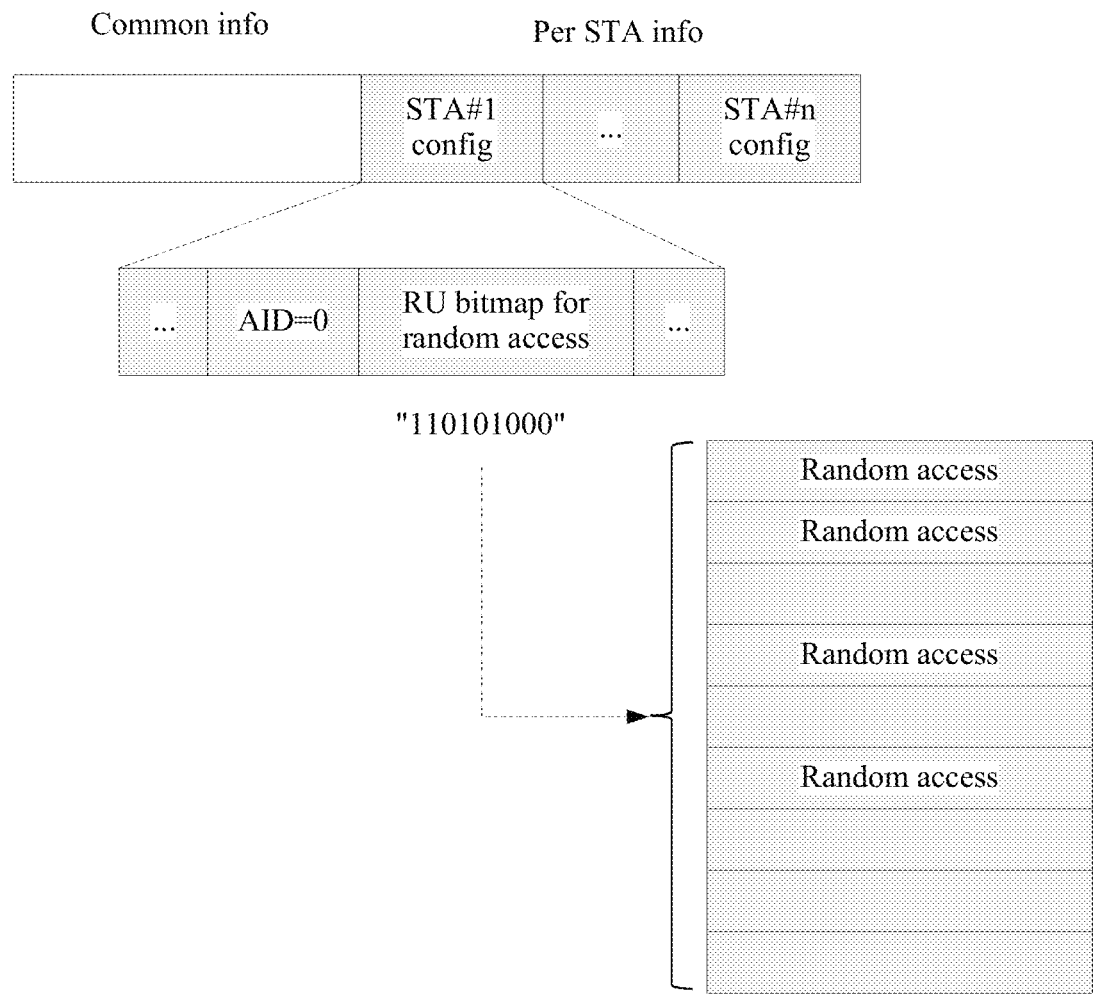
Figure 12D:
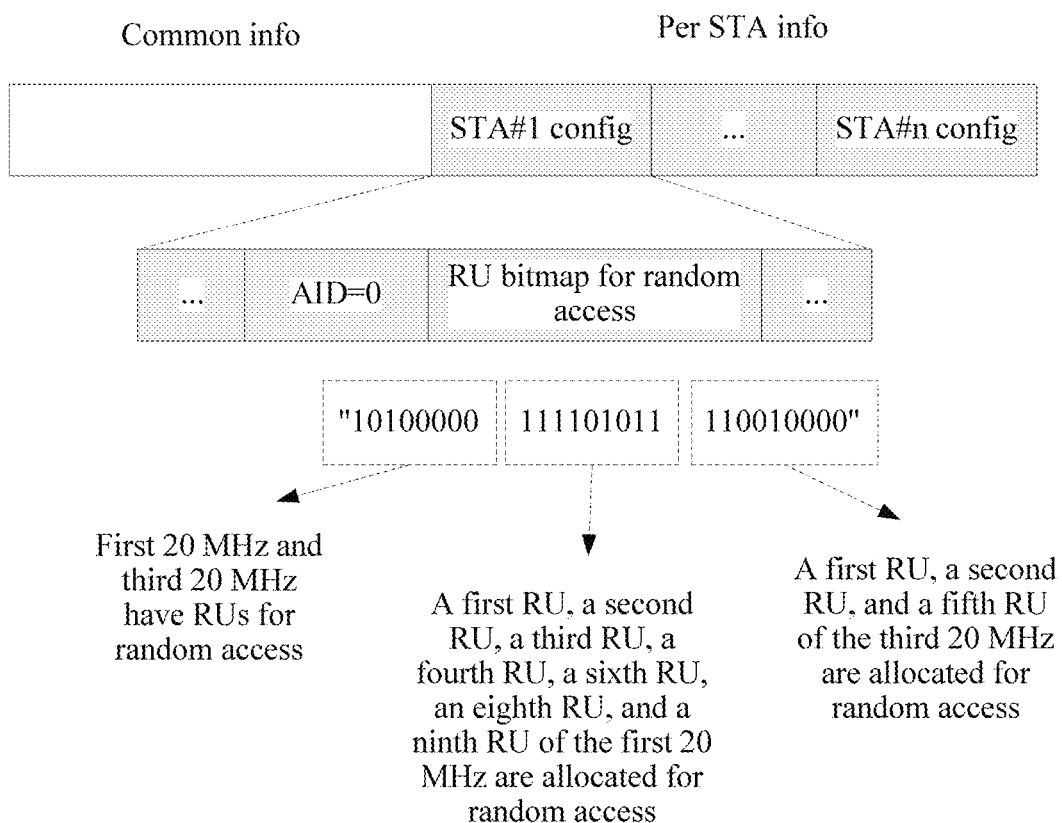

A length of the bitmap information is related to a bandwidth of uplink multiuser transmission triggered by the trigger frame. If the uplink multiuser transmission has a bandwidth of 20 MHz, and the uplink multiuser transmission includes nine minimum RUs, the length of the bitmap information is nine bits, and each bit indicates whether a corresponding RU is used for random access. If the uplink multiuser transmission has larger bandwidth, the length of the bitmap information is larger, and is equal to a quantity of minimum RUs included in the bandwidth of the uplink multiuser transmission. Specifically, bitmap information corresponding to 40 MHz has a length of 18 bits, bitmap information corresponding to 80 MHz has a length of 37 bits, and bitmap information corresponding to 160 MHz has a length of 74 bits. Optionally, the user information part may include eighth indication information I8 used to indicate a quantity of minimum RUs occupied by each random access sub-channel. Referring to FIG. 12d, a trigger frame sent by an AP includes a common information part and a user information part. The user information part includes a user identifier AID, and the user identifier AID is a special value (for example, AID=0), to indicate that a sub-channel allocated based on the user information part is used for random access. When the AID is a special value, the user information part includes the seventh indication information I7, in other words, the bitmap information that specifically indicates, in a bitmap manner, whether each RU is used for random access.

FIG. 12d is used as an example, a bandwidth of 20 MHz is used as an example, and a user information part of the trigger frame includes a special AID that indicates that the user information part includes bitmap information. Each bit in a bitmap is used to indicate whether each corresponding RU is used for random access. Because the bandwidth is 20 MHz, a length of the bitmap is nine bits. A value of the bitmap is 110101000, and this indicates that a first RU, a second RU, a fourth RU, and a sixth RU are allocated for random access.

When the bandwidth is relatively large, overheads of the bitmap are relatively high. For example, when the bandwidth is 160 MHz, a length of the bitmap is 74 bits. Therefore, the bitmap may be properly compressed to reduce the overheads. The following layered bitmap structure may be used. A first layer of a bitmap may be in units of 20 MHz. When a bandwidth is 160 MHz, eight bits may be used to indicate whether an RU in the corresponding eight 20 MHz is allocated for random access. 1 may be used to indicate that there is an RU allocated for random access, and 0 may be used to indicate that there is no RU allocated for random access. A second layer of the bitmap may perform further indication on 20 MHz corresponding to 1 in the first layer of the bitmap, each 20 MHz corresponds to nine bits, and each bit specifically indicates whether each RU is used for random access.

FIG. 12da is used as an example, and if a bandwidth is 160 MHz, a first layer of a bitmap is "10100000" that indicates that an RU in first 20 MHz and an RU in third 20 MHz are allocated for random access. A second layer of the bitmap performs further indication on the first 20 MHz and the third 20 MHz. The second layer of the bitmap is "111101011 110010000" that indicates that a first RU, a second RU, a third RU, a fourth RU, a sixth RU, an eighth RU, and a ninth RU that are in the first 20 MHz and a first RU, a second RU, and a fifth RU that are in the second 20 MHz are allocated for random access.

In addition, alternatively, the first layer of the bitmap and/or the second layer of the bitmap may be respectively replaced with an indication information field, to respectively indicate a quantity of 20 MHz including a random access RU and the number of RUs in each 20 MHz that are used for random access. For a specific location, several contiguous 20 MHz and several contiguous RUs may be fixed in the front.

Optionally, the trigger frame may include indication information, to indicate whether the layered bitmap is used. The indication information may be located in the common information part of the trigger frame, or may be located in the user information part.

For the current preferable structure 3a of the trigger frame, the user information part of the trigger frame may alternatively not include the bitmap information, but include ninth indication information I9. The I9 is used to indicate the number of RUs used for random access. The RUs used for random access may be several contiguous RUs starting from a first RU, or may be several contiguous RUs counted from a last RU. Optionally, the user information part may alternatively include tenth indication information I10, and the I10 is used to indicate a start location of the RUs used for random access. Optionally, the user information part may alternatively include eighth indication information I8. The eighth indication information I8 is used to indicate the number of minimum RUs occupied by each random access sub-channel.

Figure 12E:
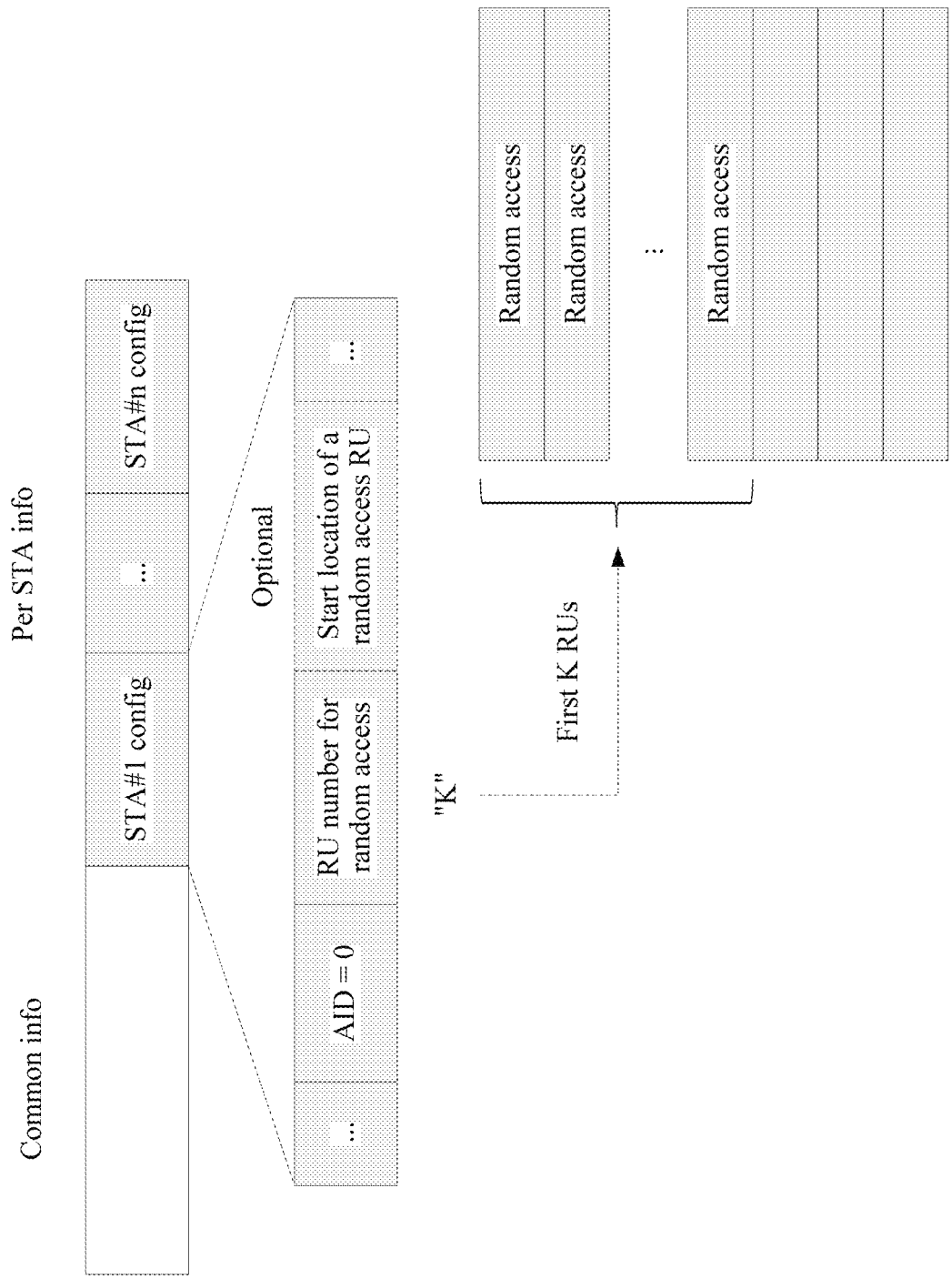
FIG. 12e, FIG. 13, FIG. 14, and FIG. 15 are respectively schematic structural diagrams of a trigger frame according to an embodiment of the present invention.

Referring to FIG. 12e, a trigger frame sent by an AP includes a common information part and a user information part. The user information part includes a user identifier AID, and the user identifier AID is a special value (for example, AID=0), to indicate that a sub-channel allocated based on the user information part is used for random access. When the AID is a special value, the user information part further includes ninth indication information I9, and I9 is used to indicate the number of RUs used for random access. For example, a value of I9 being K indicates that the first K (or the last K) RUs are used for random access.

For the current preferable structure 3a of the trigger frame, the foregoing descriptions provide two possible implementations. The bitmap information is used in a first implementation, quantity information is used in a second implementation, and the two implementations are respectively shown in FIG. 12d and FIG. 12e. The two implementations have respective advantages, the first implementation is relatively flexible, and the second implementation has relatively low overheads. To have the advantages of both the implementations, the trigger frame may include eleventh indication information I11 used to indicate that the trigger frame uses the first implementation or the second implementation. The indication information I11 may be located in the common information part of the trigger frame, or may be located in the user information part.

Structure 4 of a Trigger Frame:

A trigger frame generated and sent by an AP includes a sub-channel allocation field, and the sub-channel allocation field is used to indicate several sub-channels obtained by dividing whole bandwidth. The trigger frame further includes a user information part used to indicate a specific user or specific users (a station or a station group) whose information is transmitted by using some of the sub-channels obtained through division. Some sub-channels on which allocation indication or scheduling indication is not performed are used for random access transmission by default. In this embodiment of the present invention, an amount of user information in the user information part is less than a quantity of sub-channels in the sub-channel allocation field. The sub-channels to which no user information is allocated or indicated are used for random access by default. After receiving the trigger frame, the station parses the sub-channel allocation field and the user information part. If a sub-channel is allocated to the station, transmission is performed on the allocated sub-channel. If no sub-channel is allocated, when random access transmission needs to be performed, a sub-channel to which no user information is allocated may be randomly accessed for transmission.

In addition, optionally, the trigger frame (for example, a common information part) further includes fifth indication information I5, in other words, a random access sub-channel RU information field "RU number of random access sub-channel". The random access sub-channel RU information field is used to indicate the number of RUs occupied by each random access channel.

Figure 13:
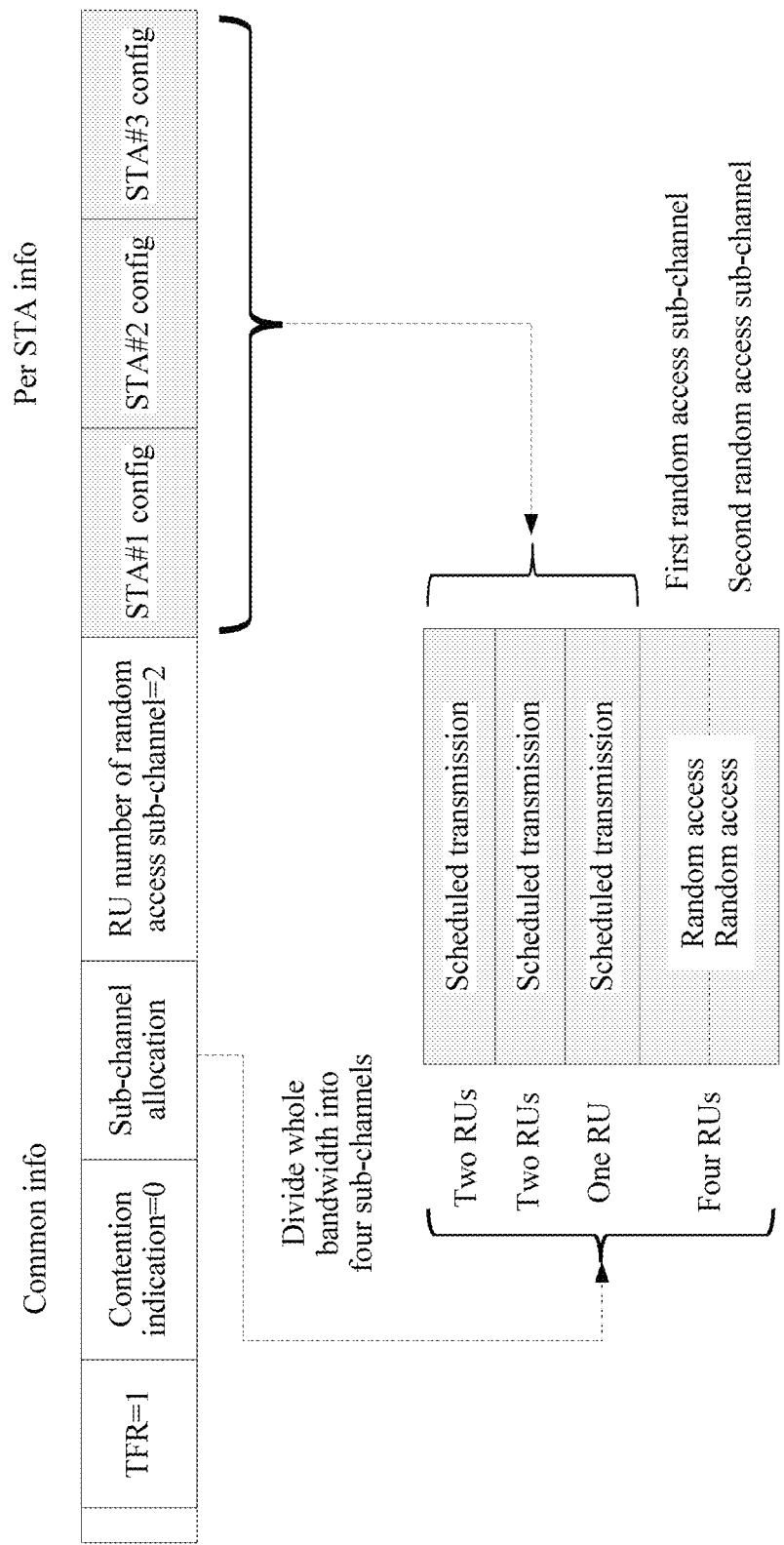

For example, referring to FIG. 13, for a bandwidth of 20 MHz (nine RUs), in the sub-channel allocation field of the trigger frame, the whole bandwidth is divided into four sub-channels, respectively occupying two RUs, two RUs, one RU, and four RUs. However, the user information part of the trigger frame has only three segments of user information. Therefore, the station receiving the trigger frame determines, based on the trigger frame, that the three segments of user information in the user information part are respectively user information of the first three sub-channels, and a fourth sub-channel (including the four RUs) is used for random access by default. If a value of the information field "RU number of random access sub-channel" is 2, the fourth sub-channel is further divided into two random access sub-channels, and each random access sub-channel occupies two RUs.

It should be noted that a TFR and a contention indication that are in FIG. 13 are optional fields.

Figure 8:
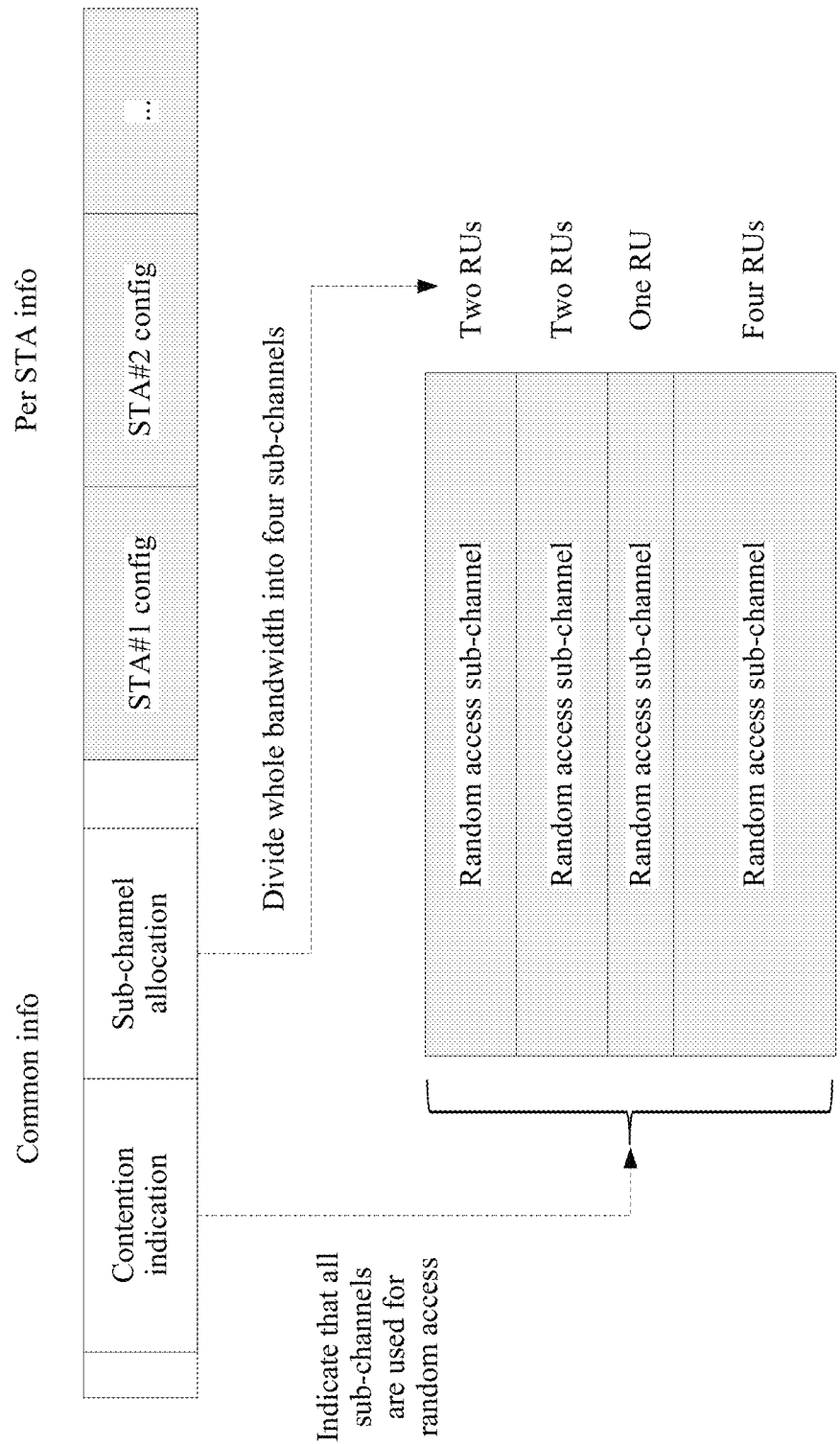
FIG. 8, FIG. 9, FIG. 10a, FIG. 10b, FIG. 11a, FIG. 11b, FIG. 12a, FIG. 12b, FIG. 12c, FIG. 12d, FIG. 12da.
Figure 14:
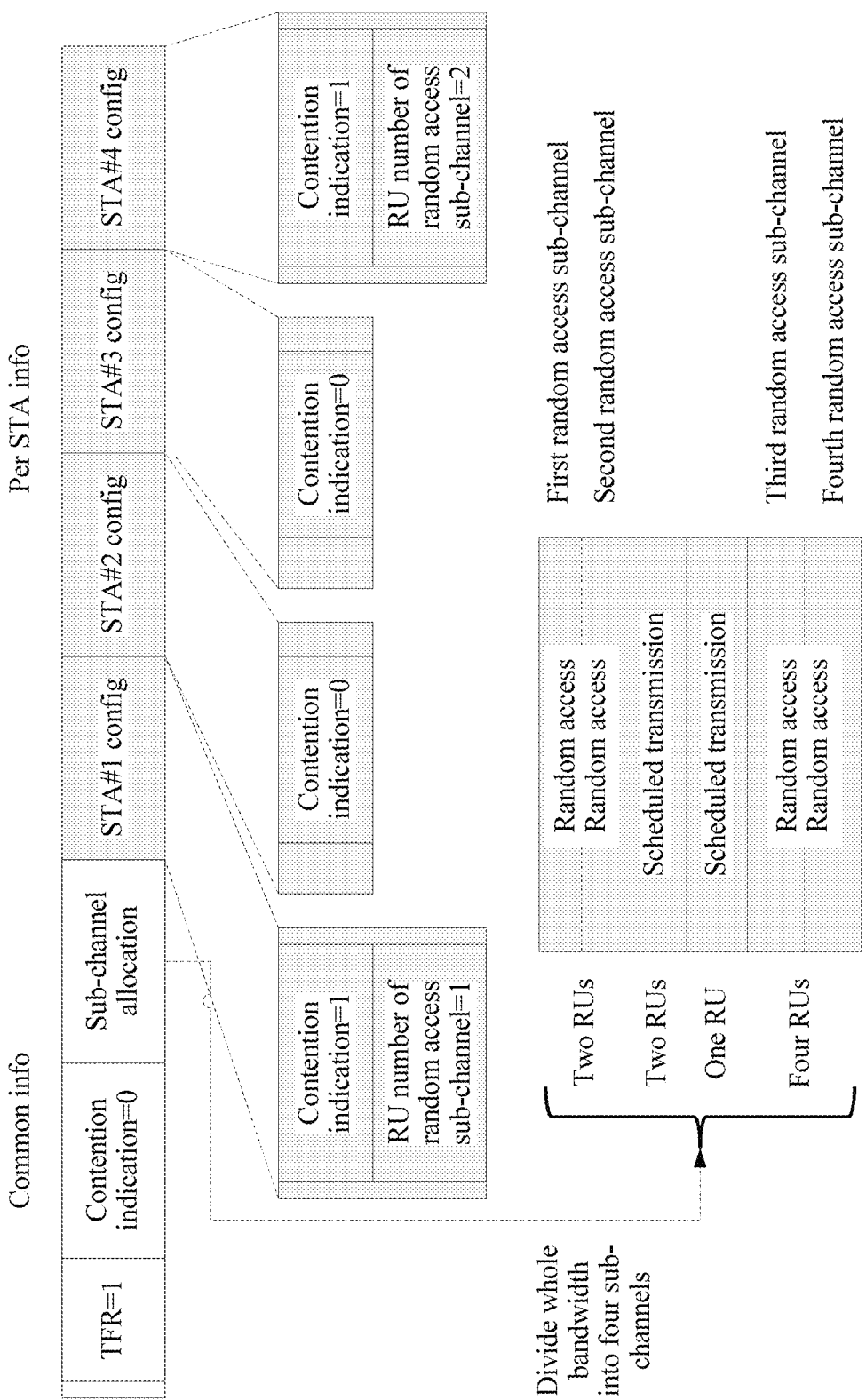

Structure 5 of a Trigger Frame:

Compared with the relatively poor trigger frame shown in FIG. 8, referring to FIG. 14, a trigger frame (for example, a common information part) sent by an AP includes a sub-channel allocation field. The sub-channel allocation field is used to divide a whole channel into several sub-channels, or is used to indicate several sub-channels obtained by dividing a whole channel. In addition, the trigger frame further includes a user information part. The user information part is used to indicate that each sub-channel obtained through division based on the sub-channel allocation field is used to perform scheduled transmission or random access transmission, and is used to transmit information about a specific station or a specific station group and a corresponding transmission parameter (in other words, configuration information) during scheduled transmission and the number of RUs occupied by each random access channel during random access transmission.

On this basis, this embodiment of the present invention proposes that, each user information part of the trigger frame may include a "sub-channel contention indication" indication bit used to indicate whether the current sub-channel is used for random access. In addition, for the sub-channel used for random access, the user information part may include a random access sub-channel RU information field "RU number of random access sub-channel" used to indicate the number of RUs occupied by each random access channel. In this way, when the quantity indicated by the information field is greater than 1, equivalently, the sub-channel may be further divided into a plurality of random access sub-channels by using the random access sub-channel RU information field. The station performs transmission by using one of the plurality of random access sub-channels during random access. In addition, the user information part may further include a user group information field "group ID" used to indicate a user group that can perform random access on a corresponding sub-channel. In this way, a user performing random access is further clearly limited, avoiding occurrence of a relatively high probability of conflicts due to excessive users' participation in random access.

It should be noted that a TFR and the contention indication field that are in FIG. 14 are optional fields.

Figure 14A:
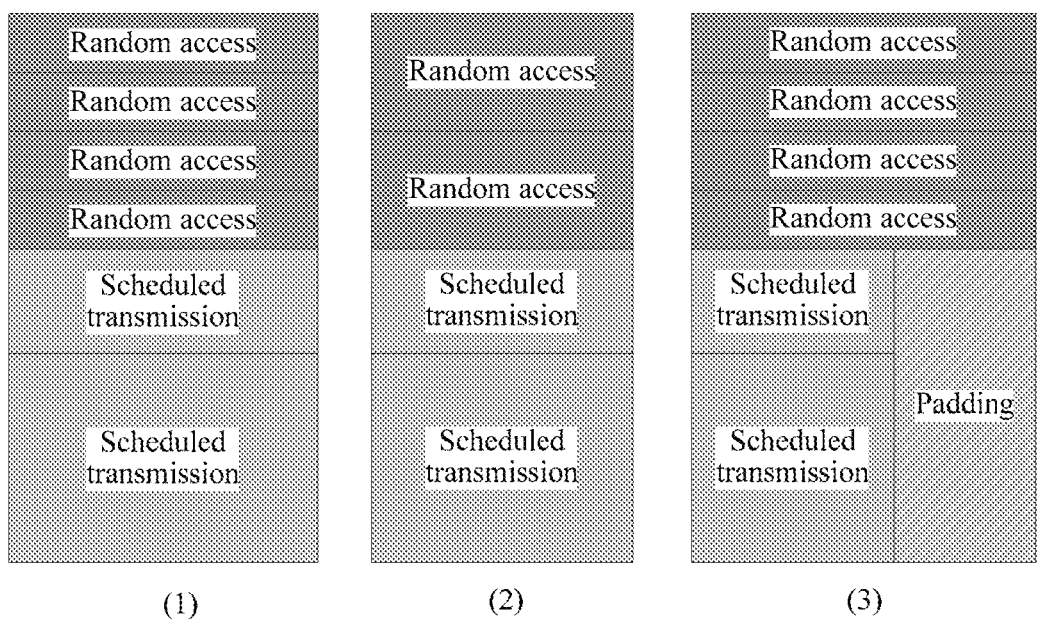
FIG. 14a is schematic diagram of sub-channel allocation for random access and scheduled transmission.

It should be noted herein that the common information part or the user information part of the trigger frame carries an information field "RU number for random access sub-channel", so that scheduled transmission and random access transmission can be effectively aligned. As shown in the following FIG. 14a, scheduled transmission occupies a relatively long time in (1), and a relatively small quantity of RUs may be allocated to a random access channel, so that random access transmission also occupies a relatively long time similar to that occupied by scheduled transmission. Scheduled transmission occupies a relatively short time in (2), and a relatively large quantity of RUs may be allocated to a random access channel, so that random access transmission also occupies a relatively short time similar to that occupied by scheduled transmission. However, if a relatively small quantity of RUs are allocated to the random access channel in this case, random access transmission occupies a relatively long time. To implement transmission alignment, a padding bit needs to be added after scheduled transmission, thereby wasting some channel resources.

Structure 6 of a Trigger Frame:

OFDMA transmission in this implementation of the present invention may include a plurality of time periods, and a frequency resource in each time period may be allocated to a plurality of users (stations or station groups) for transmission. A time period problem is not described in the embodiments mentioned above. Actually, the implementations may alternatively be applied to a case of a plurality of time periods. To be specific, the trigger frame includes an indication of a transmission time period and an indication of a random access sub-channel or a scheduled sub-channel in a corresponding time period.

Specifically, indications of the plurality of transmission time periods and an indication of a corresponding communication resource may be implemented in a plurality of manners. For example, the trigger frame includes a quantity of time periods during current transmission and indications of sequentially arranged random access sub-channels or scheduled sub-channels in the time periods. Alternatively, the trigger frame includes identifiers of sequentially arranged time periods during current transmission and indications of random access sub-channels or scheduled sub-channels for the identifiers of the time periods.

Figure 15:
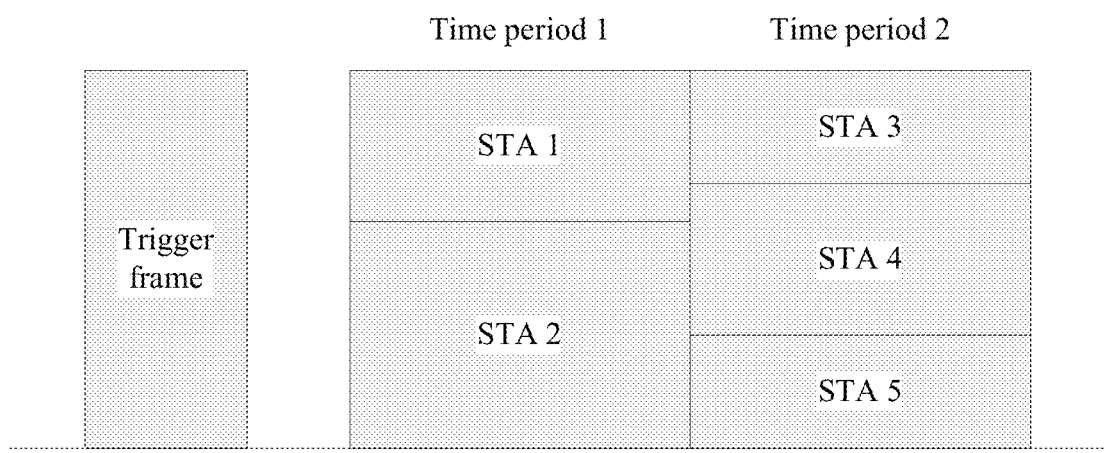

Referring to FIG. 15, an AP sends a trigger frame to trigger five STAs to separately perform transmission in two time periods, spectrum resources in a first time period are allocated to a STA 1 and a STA 2, and spectrum resources in a second time period are allocated to a STA 3, a STA 4, and a STA 5.

As mentioned above, the preferable structure 1 of the trigger frame to the preferable structure 5 of the trigger frame that are mentioned above may be used in a resource indication manner in each time period. Details are not described herein again.

The several preferable structures of the trigger frames are described above. In a wireless local area network, in step 100, an AP generates and sends the trigger frame based on an actual case, and in step 200, a station receives the trigger frame and performs transmission by using a communication resource indicated in the trigger frame. The station (if the station is not scheduled) may randomly access a sub-channel that is indicated in the trigger frame and that is used for random access. If the sub-channel is not accessed by another station, communication and transmission may be completed by using the sub-channel.

Specifically, a process in which an AP generates and sends the trigger frame based on an actual case may include the following step:

101: The AP determines a quantity M of sub-channels used for random access, or the AP determines a location of a sub-channel used for random access, or the AP further determines a quantity N of RUs (or N RUs by default) that each random access sub-channel needs to occupy, and generates the trigger frame based on the determined M or location (or further based on N).

Optionally, referring to the preferable structure 1 of the trigger frame, if the determined quantity M of sub-channels used for random access is greater than 0, a "TFR" indication bit of the generated trigger frame is 1; otherwise, a "TFR" indication bit is 0. Certainly, the "TFR" indication bit may not be included.

Optionally, referring to the preferable structure 1 of the trigger frame, if the determined quantity M of sub-channels used for random access is greater than 0, and the sub-channels used for random access occupy whole transmission bandwidth, a "contention indication" indication bit of the generated trigger frame is 1; otherwise, a "contention indication" is 0. Certainly, the "contention indication" indication bit may not be included.

Optionally, referring to the preferable structure 2 of the trigger frame, if the quantity M of sub-channels used for random access is greater than 0, the generated trigger frame includes a random access sub-channel information field "sub-channel number for random access", and a value of the information field is M.

Optionally, referring to the preferable structure 2 of the trigger frame, based on the quantity M of sub-channels used for random access, the generated trigger frame includes a total random access RU information field T "RU number for random access".

Optionally, referring to the preferable structure 2 of the trigger frame, based on the quantity N of RUs that each random access sub-channel needs to occupy, the generated trigger frame includes an information field "RU number of random access sub-channel", and a value of the information field is N. If each random access sub-channel needs to occupy one RU by default, the generated trigger frame may not include the "RU number of random access sub-channel".

Optionally, referring to the preferable structure 3 of the trigger frame, the AP adds a sub-channel allocation field to the trigger frame (for example, a common information part), to indicate several sub-channels obtained by dividing the whole bandwidth. If M>0, the trigger frame includes a random access sub-channel location information field "sub-channel location for random access" or a random access sub-channel bitmap information field "sub-channel bitmap for random access" that indicates a location of a sub-channel used for random access.

Optionally, referring to the preferable structure 4 of the trigger frame, the AP adds a sub-channel allocation field to the trigger frame (for example, a common information part), to indicate several sub-channels obtained by dividing the whole bandwidth. The trigger frame further includes a user information part used to indicate a specific user whose information is transmitted by using the sub-channel obtained through division above. Based on the quantity M that is determined by the AP and that is of sub-channels used for random access, the last M sub-channels in the plurality of sub-channels obtained through division based on the sub-channel allocation field are usually used for random access, and no indication is performed, in the user information part, on a corresponding sub-channel used for random access.

Optionally, referring to the preferable structure 5 of the trigger frame, the AP adds a sub-channel allocation field to the trigger frame (for example, a common information part), to indicate several sub-channels obtained by dividing the whole bandwidth. The trigger frame further includes a user information part used to indicate a specific user whose information is transmitted by using the sub-channel obtained through division above. Each user information part of the trigger frame includes a "sub-channel contention indication" indication bit based on the location that is determined by the AP and that is of the sub-channel used for random access, and the indication bit is used to indicate whether the current sub-channel is used for random access. The user information part may further include a random access sub-channel RU information field "RU number of random access sub-channel" based on the determined quantity N of RUs (or N RUs by default) that each random access sub-channel needs to occupy, and the random access sub-channel RU information field is used to indicate the number of RUs occupied by each random access channel.

Specifically, that the station receives the trigger frame and performs transmission by using a communication resource indicated in the trigger frame may include the following:

A STA that needs to perform transmission through OFDMA random access obtains, by reading the trigger frame sent by the AP, information about the location of the sub-channel that is indicated in the trigger frame and that can be used for random access, so that the station performs random access and transmission on the corresponding sub-channel. A random access process herein is not a focus of this implementation. Details are not described herein. The process in which the station obtains the information about the location of the sub-channel that is indicated in the trigger frame and that can be used for random access may vary with the structures of the trigger frame.

Optionally, referring to the preferable structure 1 of the trigger frame, in step 201, after receiving the trigger frame, a STA that needs to perform transmission through OFDMA random access reads a "TFR" indication bit; and if the indication bit is 1, further reads a "contention indication" indication bit.

202: If the "TFR" indication bit is 0, it indicates that no resource of the trigger frame is allocated for random access, and random access information is no longer obtained. If the "contention indication" indication bit is 1, and the indication bit is 0, it indicates that no resource of the trigger frame is allocated for random access.

203: If the "contention indication" indication bit read in step 201 is 1, and it indicates that whole transmission bandwidth is used for random access, a sub-channel may be randomly selected for random access. A specific location of the sub-channel may be determined based on the number of RUs occupied by the sub-channel (in other words, the information field "RU number of random access sub-channel") or the number of RUs occupied by a default sub-channel.

Figure 16:
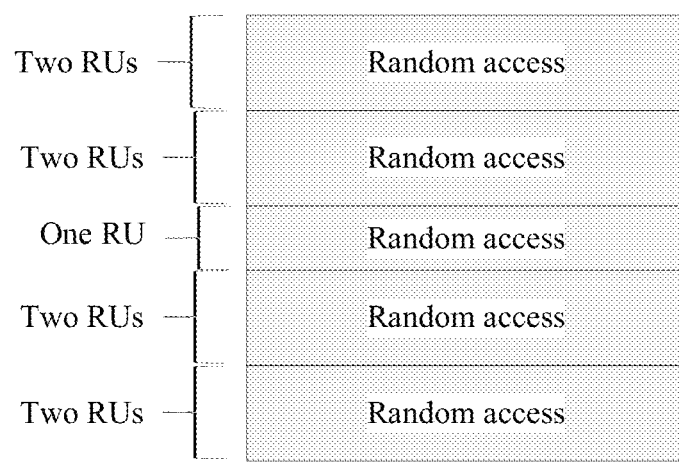
FIG. 16 is a schematic diagram of a location of a sub-channel according to an embodiment of the present invention.

For example, a next-generation Wi-Fi standard is used as an example, and a bandwidth of a sub-channel occupied by each user is one RU, two RUs, four RUs, or nine RUs in a bandwidth of 20 MHz. Therefore, a value of N in step 203 is 1, 2, 4, or 9. In addition, based on the sub-channel allocation information described above, RUs at some special locations can be independently used as only one sub-channel for transmission, for example, a middle RU in the bandwidth of 20 MHz. Therefore, when the location of the random access sub-channel is determined, the RUs at the special locations are used as an independent random access sub-channel, and other RUs are determined based on the value of N. For example, if the information obtained by the station in step 201 and step 202 includes: the bandwidth of 20 MHz is all used for random access, and each random access sub-channel occupies two RUs (in other words, N=2), because it is already known that the 20 MHz includes nine RUs, and a middle RU (the fifth RU) can be independently used as only one sub-channel for transmission, the other eight RUs may be grouped, based on N=2, into four sub-channels used for random access. In other words, the location of the sub-channel that may be used for random access is shown in FIG. 15, and the STA that needs to perform random access randomly selects one sub-channel from five sub-channels shown in FIG. 16, so that the STA accesses the sub-channel.

Optionally, referring to the preferable structure 2 of the trigger frame, the STA reads a value of M of an information field "sub-channel number for random access" in the trigger frame, or further reads a value of N (which may be L by default) of an information field "RU number of random access sub-channel", and determines, based on M and N, a location of a sub-channel used for random access: the sub-channel used for random access occupies M×N contiguous RUs at the beginning or at the end of a whole frequency band (for example, 20 MHz), and an $i^{th}$ sub-channel or an $i^{th}$-from-last sub-channel occupies an $((i-1)\times N+1)^{th}$ RU to an $(i\times N)^{th}$ RU.

Optionally, referring to the preferable structure 2 of the trigger frame, the STA reads a value T of "RU number for random access" in the trigger frame, or further reads a value of N (which may be L by default) of an information field "RU number of random access sub-channel", and determines, based on M and N, a location of a sub-channel used for random access: the sub-channel used for random access occupies T contiguous RUs at the beginning or at the end of a whole frequency band (for example, 20 MHz). If an RU used for random access includes an RU at a special location (for example, a middle RU in the bandwidth of 20 MHz), the RU at the special location is used as an independent random access sub-channel. For other RUs, each random access sub-channel occupies N contiguous RUs. If it is found that a remaining RU is not enough to constitute the N contiguous RUs, the remaining RU is used as an independent random access sub-channel.

Optionally, referring to the preferable structure 3 of the trigger frame, the STA reads an information field "sub-channel location for random access" in a common information part of the trigger frame, or further determines, based on an information field "RU number of random access sub-channel" N (which may be L by default), a location of a sub-channel used for random access. Specifically, the STA determines, based on the information field "sub-channel location for random access", each sub-channel used for random access, and obtains a location of a start RU of the sub-channel (a first RU of the sub-channel). If a location of a start RU of a sub-channel allocated for random access is S, and a value of an information field "RU number of random access sub-channel" is N, a first random access sub-channel occupies an $(S+1)^{th}$ RU to an $(S+N)^{th}$ RU, a second sub-channel occupies an $(S+N+1)^{th}$ RU to an $(S+2N)^{th}$ RU, and so on. After the $i^{th}$ sub-channel occupies an $(S+(i-1)\times N+1)^{th}$ RU to an $(S+i\times N)^{th}$ RU, and a quantity of remaining RUs is greater than 0 and is less than N, all remaining RUs are used as one random access sub-channel.

Optionally, referring to the preferable structure 4 of the trigger frame, the STA reads a sub-channel allocation field in the trigger frame (for example, a common information part), and determines the location that is indicated by the field and that is of the sub-channel and a quantity of sub-channels. The STA reads a user information part of the trigger frame, and determines an amount of user information included in the user information part. If the amount U of user information included in the user information part is less than a quantity J of sub-channels obtained through division based on the sub-channel allocation field, the last J-U sub-channels are used for random access. The STA may further read an information field (which may be L by default) "RU number of random access sub-channel", so that the location of the sub-channel used for random access is determined. Specifically, the STA may determine, based on the sub-channel allocation field and the user information part, a total quantity of RUs occupied by a sub-channel used for scheduled transmission. If the total quantity of RUs occupied by the sub-channel used for scheduled transmission is S, and a value of an information field "RU number of random access sub-channel" is N, a first random access sub-channel occupies an $(S+1)^{th}$ RU to an $(S+N)^{th}$ RU, a second sub-channel occupies an $(S+N+1)^{th}$ RU to an $(S+2N)^{th}$ RU, and so on. After the $i^{th}$ sub-channel occupies an $(S+(i-1)\times N+1)^{th}$ RU to an $(S+i\times N)^{th}$ RU, and a quantity of remaining RUs is greater than 0 and is less than N, all remaining RUs are used as one random access sub-channel.

Optionally, referring to the preferable structure 5 of the trigger frame, the STA that needs to perform random access reads a "sub-channel contention indication" indication bit in a user information part corresponding to a sub-channel, and may further read an information field "RU number of random access sub-channel" (which is located in a common information part or the user information part, or is L by default), so that a location of a sub-channel used for random access is determined. Specifically, the STA reads all user information parts, finds each sub-channel used for random access, and obtains a location of a start RU of the sub-channel. If a location of a start RU of a sub-channel allocated for random access is S, and a value of an information field "RU number of random access sub-channel" in corresponding user information is N, a first random access sub-channel occupies an $(S+1)^{th}$ RU to an $(S+N)^{th}$ RU, a second sub-channel occupies an $(S+N+1)^{th}$ RU to an $(S+2N)^{th}$ RU, and so on. After the $i^{th}$ sub-channel occupies an $(S+(i-1)\times N+1)^{th}$ RU to an $(S+i\times N)^{th}$ RU, and a quantity of remaining RUs is greater than 0 and is less than N, all remaining RUs are used as one random access sub-channel. For example, if the whole bandwidth is divided into four sub-channels by using the sub-channel allocation field, the sub-channels respectively occupy two RUs, two RUs, one RU, and four RUs, a first sub-channel and a fourth sub-channel are used for random access based on an indication of indication information, a value of an information field "RU number of random access sub-channel" in user information corresponding to the first sub-channel is 1, and a value of an information field "RU number of random access sub-channel" in user information corresponding to the fourth sub-channel is 2, four random access sub-channels are generated during current allocation, a first random access sub-channel occupies a first RU, a second random access sub-channel occupies a second RU, a third random access sub-channel occupies a sixth RU and a seventh RU, and a fourth random access sub-channel occupies an eighth RU and a ninth RU.

Optionally, referring to the preferable structure 6 of the trigger frame, the STA that needs to perform random access may read information about a time period in the trigger frame, determine, based on information about a sub-channel that is for random access and that is in each time period, a location of a sub-channel that is for random access and that is in each corresponding time period, and select, in the corresponding time period, a sub-channel used for random access from sub-channels that may be randomly accessed, so that the STA accesses the sub-channel.

Correspondingly, another implementation provides a resource indication processing apparatus (not shown in a figure). The resource indication processing apparatus is applied to a wireless local area network that uses an OFDMA technology, and includes a processing unit, configured to send or receive the trigger frame in the foregoing implementations. For a specific structure and specific content of the trigger frame, refer to the foregoing implementations. Details are not described herein again. The processing unit may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of a hardware module and a software module that are in the processor. It may be easily understood that when specifically sending the trigger frame, the resource indication processing apparatus may be located in an access point; and when specifically receiving the trigger frame, the resource indication processing apparatus may be located in a station.

Figure 17:
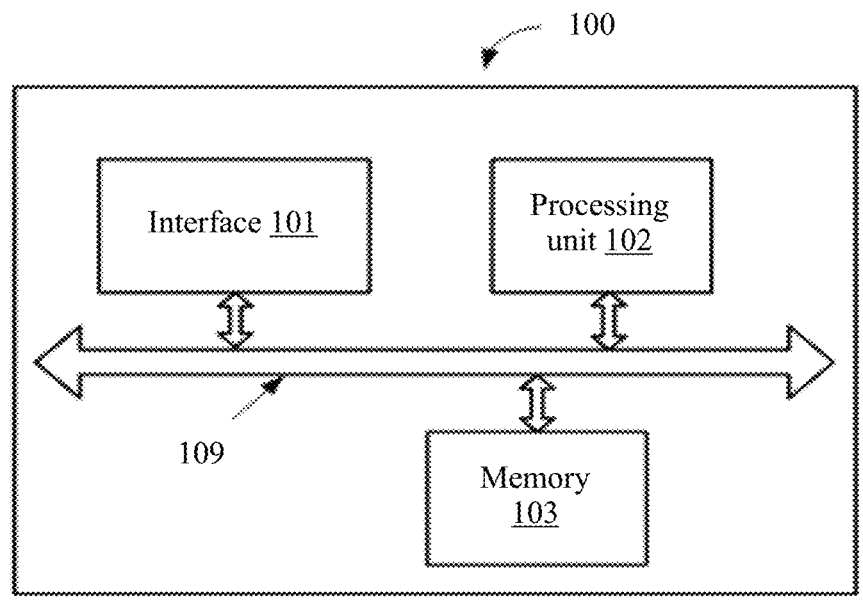
FIG. 17 is a block diagram of an access point according to an embodiment of the present invention.

FIG. 17 is a block diagram of an access point according to another embodiment of the present invention. The access point in FIG. 17 includes an interface 101, a processing unit 102, and a memory 103. The processing unit 102 controls an operation of the access point 100. The memory 103 may include a read-only memory and a random access memory, and provide an instruction or data for the processing unit 102. A part of the memory 103 may further include a non-volatile random access memory (NVRAM). Components of the access point 100 are coupled together by using a bus system 109. In addition to a data bus, the bus system 109 includes a power bus, a control bus, and a status signal bus. However, for clear description, various types of buses in the figure are marked as the bus system 109.

The method for sending each of the foregoing trigger frames disclosed in the foregoing embodiments of the present invention may be applied to the processing unit 102, or implemented by the processing unit 102. During implementation, the steps in the foregoing methods may be completed by using an integrated logic circuit of hardware in the processing unit 102 or an instruction in a form of software. The processing unit 102 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of a hardware module and a software module that are in the processor. The software module may be located in a mature storage medium in the art, such as a random access memory, a flash memory, a read-only memory, a programmable read-only memory, an electrically erasable programmable memory, or a register. The storage medium is located in the memory 103. The processing unit 102 reads information in the memory 103 and completes the steps in the foregoing methods in combination with hardware of the processing unit.

Figure 18:
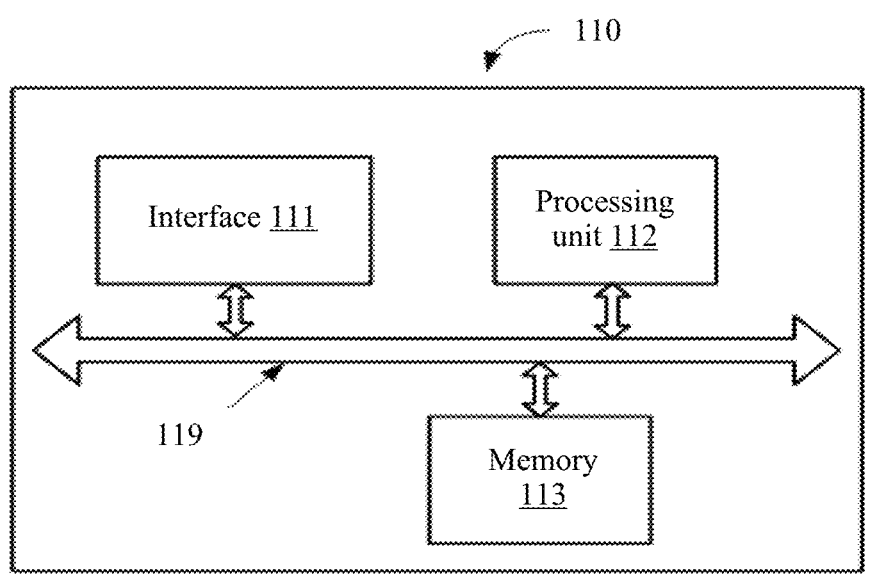
FIG. 18 is a block diagram of a station according to an embodiment of the present invention.

FIG. 18 is a block diagram of a station according to another embodiment of the present invention. The station in FIG. 18 includes an interface 111, a processing unit 112, and a memory 113. The processing unit 112 controls an operation of the station 110. The memory 113 may include a read-only memory and a random access memory, and provide an instruction and data for the processing unit 112. A part of the memory 113 may further include a non-volatile random access memory (NVRAM). Components of the base station 110 are coupled together by using a bus system 119. In addition to a data bus, the bus system 119 includes a power bus, a control bus, and a status signal bus. However, for clear description, various types of buses in the figure are marked as the bus system 119.

The method for receiving each of the foregoing trigger frames and the processing method based on the trigger frame that are disclosed in the embodiments of the present invention may be applied to the processing unit 112, or implemented by the processing unit 112. During implementation, the steps in the foregoing methods may be completed by using an integrated logic circuit of hardware in the processing unit 112 or an instruction in a form of software. The processing unit 112 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of a hardware module and a software module that are in the processor. The software module may be located in a mature storage medium in the art, such as a random access memory, a flash memory, a read-only memory, a programmable read-only memory, an electrically erasable programmable memory, or a register. The storage medium is located in the memory 113. The processing unit 112 reads information in the memory 113 and completes the steps in the foregoing methods in combination with hardware of the processing unit.

Specifically, the memory 113 stores an instruction enabling the processing unit 112 to perform the following operations: determining resource status information, where the resource status information indicates a busy/idle status of a sub-resource of a channel resource used for data transmission between an access point and a station; and sending the resource status information to the access point, so that the access point allocates a resource based on the resource status information.

It should be understood that "an embodiment" mentioned throughout the whole specification means that particular features, structures, or characteristics related to the embodiment are included in at least one embodiment of the present invention. Therefore, "in an embodiment" appearing throughout the specification does not necessarily mean a same embodiment. In addition, these particular features, structures, or characteristics may be combined in one or more embodiments by using any proper manner. Sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of the present invention, "B corresponding to A" indicates that B is associated with A, and B may be determined based on A. However, it should further be understood that determining B based on A does not mean that B is determined based on A only. In other words, B may be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and that is accessible to a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (Disk) and a disc (disc) used by the present invention include a compact disc CD, a laser disc, an optical disc, a digital versatile disc (DVD), a floppy disk and a Blu-ray disc, where the disk usually copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the principle of the present invention shall fall within the protection scope of the present invention.

What is claimed is:

1. A Wireless Local Area Network (WLAN) transmitting method,
the method comprising:
sending, by an access point (AP), a trigger frame which includes a common information part and one or more user information parts located after the common information part,
wherein the common information part comprises sub-channel allocation information for indicating one or more sub-channels,
wherein at least one of the one or more user information parts comprises a user identifier (AID), a start location indication field and a number indication field,
wherein the AID is a value indicating that one or more contiguous resource units (RUs) allocated based on the at least one of the one or more user information parts are used for random access, the start location indication field is used to indicate a start location of the one or more contiguous RUs used for random access, and the number indication field is used to indicate a number of the one or more contiguous RUs used for random access, and
wherein the sub-channel allocation information further indicates a quantity of RUs, of the one or more contiguous RUs, associated with each sub-channel indicated by the sub-channel allocation information.

2. The method of claim 1, wherein the value of the AID comprises: 0.

3. The method of claim 1, wherein the sub-channel allocation information indicates the one or more sub-channels by dividing a whole channel into the one or more sub-channels.

4. The method of claim 1, wherein the sub-channel allocation information comprises a bitwise mapping specifying the quantity of RUs for each sub-channel.

5. A Wireless Local Area Network (WLAN) receiving method,
the method comprising:
receiving, by a station, a trigger frame which includes a common information part and one or more user information parts located after the common information part,
wherein the common information part comprises sub-channel allocation information for indicating one or more sub-channels,
wherein at least one of the one or more user information parts comprises a user identifier (AID), a start location indication field and a number indication field,
wherein the AID is a value indicating that one or more contiguous resource units (RUs) allocated based on the at least one of the one or more user information parts is used for random access, the start location indication field is used to indicate a start location of the one or more contiguous RUs used for random access, and the number indication field is used to indicate a number of the one or more contiguous RUs used for random access, and
wherein the sub-channel allocation information further indicates a quantity of RUs, of the one or more contiguous RUs, associated with each sub-channel indicated by the sub-channel allocation information.

6. The method of claim 5, wherein the value of the AID comprises: 0.

7. An apparatus of a Wireless Local Area Network (WLAN) comprising:
a processor; and
a memory communicatively coupled with the processor and storing instructions that when executed by the processor, configure the processor for:
sending a trigger frame, which includes a common information part and one or more user information parts located after the common information part,
wherein the common information part comprises sub-channel allocation information for indicating one or more sub-channels,
wherein at least one of the one or more user information parts comprises a user identifier (AID), a start location indication field and a number indication field,
wherein the AID is a value indicating that one or more contiguous resource units (RUs) allocated based on the at least one of the one or more user information parts are used for random access, the start location indication field is used to indicate a start location of the one or more contiguous RUs used for random access, and the number indication field is used to indicate a number of the one or more contiguous RUs used for random access, and
wherein the sub-channel allocation information further indicates a quantity of RUs, of the one or more contiguous RUs, associated with each sub-channel indicated by the sub-channel allocation information.

8. The apparatus of claim 7, wherein the value of the AID comprises: 0.

9. An apparatus of a Wireless Local Area Network (WLAN) comprising:
a processor; and
a memory communicatively coupled with the processor and storing instructions that when executed by the processor, configure the processor for:
receiving a trigger frame, which includes a common information part and one or more user information parts located after the common information part,
wherein the common information part comprises sub-channel allocation information for indicating one or more sub-channels,
wherein at least one of the one or more user information parts comprises a user identifier (AID), a start location indication field and a number indication field,
wherein the AID is a value indicating that one or more contiguous resource units (RUs) allocated based on the at least one of the one or more user information parts is used for random access, the start location indication field is used to indicate a start location of the one or more contiguous RUs used for random access, and the number indication field is used to indicate a number of the one or more contiguous RUs used for random access, and
wherein the sub-channel allocation information further indicates a quantity of RUs, of the one or more contiguous RUs, associated with each sub-channel indicated by the sub-channel allocation information.

10. The apparatus of claim 9, wherein the value of the AID comprises: 0.

* * * * *